(12) United States Patent
Oshima

(10) Patent No.: US 12,014,229 B2
(45) Date of Patent: Jun. 18, 2024

(54) PRINT DATA DISPLAY SYSTEM WITH DATA CONVERSION OPTIONS

(71) Applicant: SEIKO EPSON CORPORATION, Tokyo (JP)

(72) Inventor: Yoshinori Oshima, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 18/157,201

(22) Filed: Jan. 20, 2023

(65) Prior Publication Data

US 2023/0237295 A1 Jul. 27, 2023

(30) Foreign Application Priority Data

Jan. 21, 2022 (JP) ................................. 2022-007925

(51) Int. Cl.
*G06K 15/02* (2006.01)
*G06K 15/12* (2006.01)
*H04N 1/00* (2006.01)

(52) U.S. Cl.
CPC ....... *G06K 15/1898* (2013.01); *G06K 15/128* (2013.01); *H04N 1/00427* (2013.01); *H04N 1/00472* (2013.01)

(58) Field of Classification Search
CPC ............. G06K 15/1898; G06K 15/128; G06K 15/005; H04N 1/00427; H04N 1/00472; G06F 3/1206; G06F 3/1256; G06F 3/1284; G06F 3/1253; G06F 3/1242; G06F 3/1243; B41J 3/4075; B41J 3/01
See application file for complete search history.

(56) References Cited

U.S. PATENT DOCUMENTS

| | | | | |
|---|---|---|---|---|
| 2007/0195337 | A1* | 8/2007 | Takayama | G06K 15/02 358/1.15 |
| 2008/0074697 | A1* | 3/2008 | Sawada | B41J 3/4075 358/1.15 |
| 2018/0288251 | A1 | 10/2018 | Yamada | |
| 2019/0212951 | A1* | 7/2019 | Yasui | G06F 3/1205 |
| 2019/0303075 | A1* | 10/2019 | Yamada | G06F 3/1273 |
| 2021/0334049 | A1* | 10/2021 | Shikama | G06F 3/1206 |
| 2022/0222022 | A1* | 7/2022 | Yamada | G06F 3/1206 |
| 2022/0405026 | A1* | 12/2022 | Shikama | G06F 3/1253 |

FOREIGN PATENT DOCUMENTS

| | | |
|---|---|---|
| JP | 2018-173898 A | 11/2018 |
| JP | 2019-121315 A | 7/2019 |

* cited by examiner

*Primary Examiner* — Iriana Cruz
(74) *Attorney, Agent, or Firm* — Oliff PLC

(57) ABSTRACT

An information processing device includes a table data acquirer that acquires table data; a print data generator that generates print data including an unconverted image in which information stored in the table data is not converted into other information when a user selects a text option and that generates the print data including a first code image obtained by converting the information stored in the table data into a one-dimensional code image when the user selects a one-dimensional code option; and a display controller that displays, on a touch panel, a fourth operation screen including an option region in which a plurality of options including the text option and the one-dimensional code option are displayed and a second table data region in which the table data is displayed.

8 Claims, 16 Drawing Sheets

PRINT DATA DISPLAY SYSTEM WITH DATA CONVERSION OPTIONS

The present application is based on, and claims priority from JP Application Serial Number 2022-007925, filed Jan. 21, 2022, the disclosure of which is hereby incorporated by reference herein in its entirety.

BACKGROUND

1. Technical Field

The present disclosure relates to an information processing device, a method for controlling an information processing device, and a non-transitory computer-readable storage medium storing a program.

2. Related Art

As disclosed in JP-A-2019-121315, an information processing device is known, which acquires information from table data and generates print data based on the acquired information.

Among users who use such information processing devices, a user who wants to convert information such as text acquired from table data into a one-dimensional code image and print the converted one-dimensional code image is present. In addition, among the users, a user who wants to print information such as text acquired from table data without converting the information into a code image is present. It is conceivable that an information processing device displays, on a screen, an option region for a user to select either a first conversion option to convert information into a one-dimensional code image or a non-conversion option not to convert information into a code image and generates print data for printing the one-dimensional code image or text according to the option selected by the user. However, when the information processing device cannot simultaneously display the option region and table data or when a display included in the information processing device is small, the user cannot select a desired option from the option region while checking the table data. Therefore, in this case, the user may perform an erroneous operation such as mistakenly selecting the first conversion option from the option region even though text that cannot be converted into a one-dimensional image is stored in the table data.

SUMMARY

According to an aspect of the present disclosure, an information processing device includes a table data acquirer that acquires table data; a print data generator that generates print data including an unconverted image in which information stored in the table data is not converted into other information when a user selects a non-conversion option and that generates the print data including a first code image obtained by converting the information stored in the table data into a code image of a first type when the user selects a first conversion option; and a display controller that displays, on a display unit, a second screen including an option region in which a plurality of options including the non-conversion option and the first conversion option are displayed and a second table data region in which the table data is displayed.

According to another aspect of the present disclosure, a method for controlling an information processing device includes causing the information processing device to acquire table data; causing the information processing device to generate print data including an unconverted image in which information stored in the table data is not converted into other information when a user selects a non-conversion option, and generate the print data including a first code image obtained by converting the information stored in the table data into a code image of a first type when the user selects a first conversion option; and causing the information processing device to display, on a display unit, a second screen including an option region in which a plurality of options including the non-conversion option and the first conversion option are displayed and a second table data region in which the table data is displayed.

According to still another aspect of the present disclosure, a non-transitory computer-readable storage medium stores a program including causing an information processing device to acquire table data; causing the information processing device to generate print data including an unconverted image in which information stored in the table data is not converted into other information when a user selects a non-conversion option, and generate the print data including a first code image obtained by converting the information stored in the table data into a code image of a first type when the user selects a first conversion option; and causing the information processing device to display, on a display unit, a second screen including an option region in which a plurality of options including the non-conversion option and the first conversion option are displayed and a second table data region in which the table data is displayed.

DESCRIPTION OF EXEMPLARY EMBODIMENTS

Figure 1:
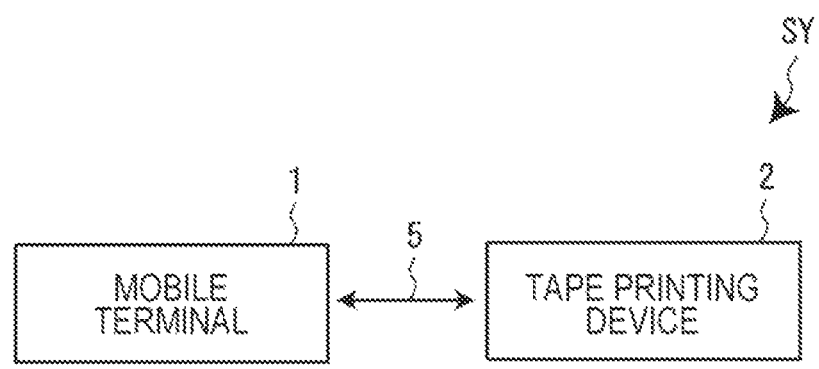
FIG. 1 is a diagram illustrating a configuration of a tape printing system.

Hereinafter, an information processing device, a method for controlling an information processing device, and a non-transitory computer-readable storage medium storing a program are described with reference to the accompanying drawings. FIG. 1 is a diagram illustrating a configuration of a tape printing system SY. The tape printing system SY includes a mobile terminal 1 and a tape printing device 2. The mobile terminal 1 and the tape printing device 2 are communicably connected to each other via radio communication 5. The mobile terminal 1 is an example of an "information processing device". The mobile terminal 1 and the tape printing device 2 may be connected to each other via a cable or may be connected to each other via a network, instead of the radio communication 5.

The mobile terminal 1 is, for example, a smartphone. The mobile terminal 1 generates print data for performing printing on a tape T illustrated in FIG. 2 and transmits the generated print data to the tape printing device 2. The tape T is a print medium for the tape printing device 2. The tape printing device 2 prints a print image PG illustrated in FIG. 16 on the tape T based on the print data transmitted from the mobile terminal 1.

Figure 3:
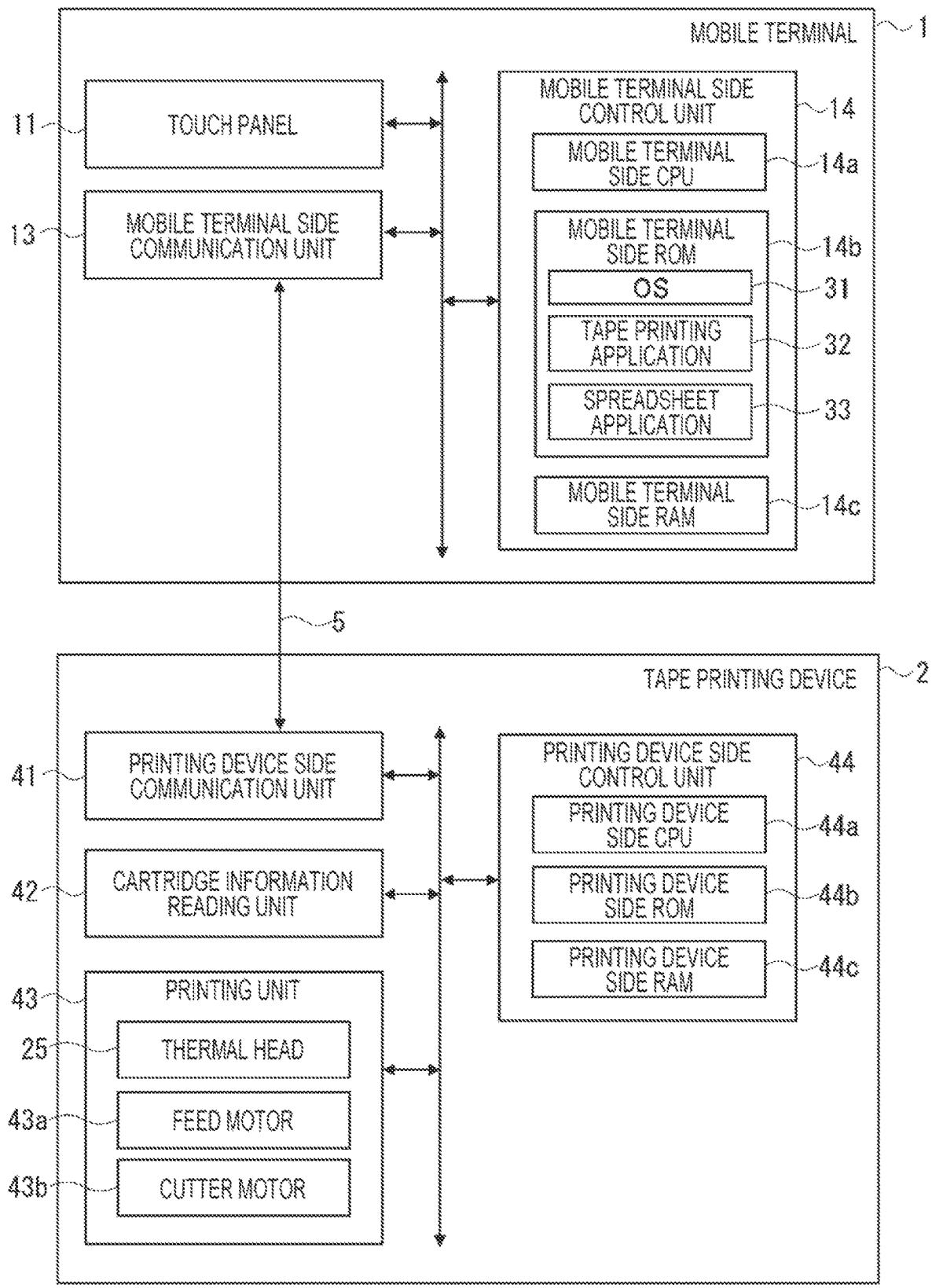
FIG. 3 is a block diagram illustrating a hardware configuration of a mobile terminal and a hardware configuration of the tape printing device.

As illustrated in FIG. 3, the mobile terminal 1 displays, on a touch panel 11 included in the mobile terminal 1, operation screens D for editing the print data. FIGS. 5 to 15 illustrate the operation screens D. The touch panel 11 is an example of a "display unit". The mobile terminal 1 according to the present embodiment reads table data and generates a plurality of print data items so that a plurality of print images PG based on a plurality of information items stored in the read table data are printed on the tape T. That is, the mobile terminal 1 according to the present embodiment can generate print data for performing merge printing using the table data. The "table data" indicates data in a table format generated by a spreadsheet application 33 or the like. In the present embodiment, it is assumed that information stored in the table data is text.

The mobile terminal 1 can generate print data including a first code image obtained by converting the information stored in the table data into a one-dimensional code image and generate the print data including a second code image obtained by converting the information stored in the table data into a two-dimensional code image. The one-dimensional code image is an example of a "code image of a first type". The two-dimensional code image is an example of a "code image of a second type". Examples of the one-dimensional code image are a JAN code, an ITF code, and Code 39. Examples of the two-dimensional code image are a QR code (registered trademark), DataMatrix, and PDF 417.

The mobile terminal 1 generates print data illustrated in FIG. 8 according to which option is selected by a user from among a plurality of options including a text option 97, a one-dimensional code option 98, and a two-dimensional code option 99 on a fourth operation screen D4 described later. The fourth operation screen D4 is an example of a "second screen". The text option 97 is an example of a "non-conversion option". The one-dimensional code option 98 is an example of a "first conversion option". The two-dimensional code option 99 is an example of a "second conversion option".

Specifically, when the user selects the text option 97, the mobile terminal 1 generates print data including an unconverted image in which the information stored in the table data is not converted into other information. That is, when the user selects the text option 97, the mobile terminal 1 generates the print data including the unconverted image that is an image indicating the text itself stored in the table data. When the user selects the one-dimensional code option 98, the mobile terminal 1 converts the text stored in the table data into a one-dimensional code and generates the print data including a first code image. When the user selects the two-dimensional code option 99, the mobile terminal 1 converts the text stored in the table data into a two-dimensional code and generates the print data including a second code image.

The mobile terminal 1 displays, as a part of a print image PI of the tape T, a block B indicating any one of the unconverted image, the first code image, and the second code image according to which option is selected by the user from among the text option 97, the one-dimensional code option 98, and the two-dimensional code option 99. Therefore, the user can check how the information stored in the table data is converted and merged.

The fourth operation screen D4 includes an option region E17 in which the text option 97, the one-dimensional code option 98, and the two-dimensional code option 99 are displayed and a second table data region E18 in which the table data is displayed. That is, the mobile terminal 1 simultaneously displays, on the touch panel 11, the table data for performing merge printing and the plurality of options for selecting how the information stored in the table data is converted and merged. Therefore, the user can select an option while checking the table data. In addition, it is possible to suppress an erroneous operation in which the user mistakenly selects the one-dimensional code option 98 or the two-dimensional code option 99 from the option region E17 even though text that cannot be converted into a one-dimensional code image or a two-dimensional code image is stored in table data. The "text that cannot be converted into a one-dimensional code image or a two-dimensional code image" is, for example, a machine-dependent character, an old character, or the like. In the present embodiment, operations relating to merge printing are mainly described.

Figure 2:
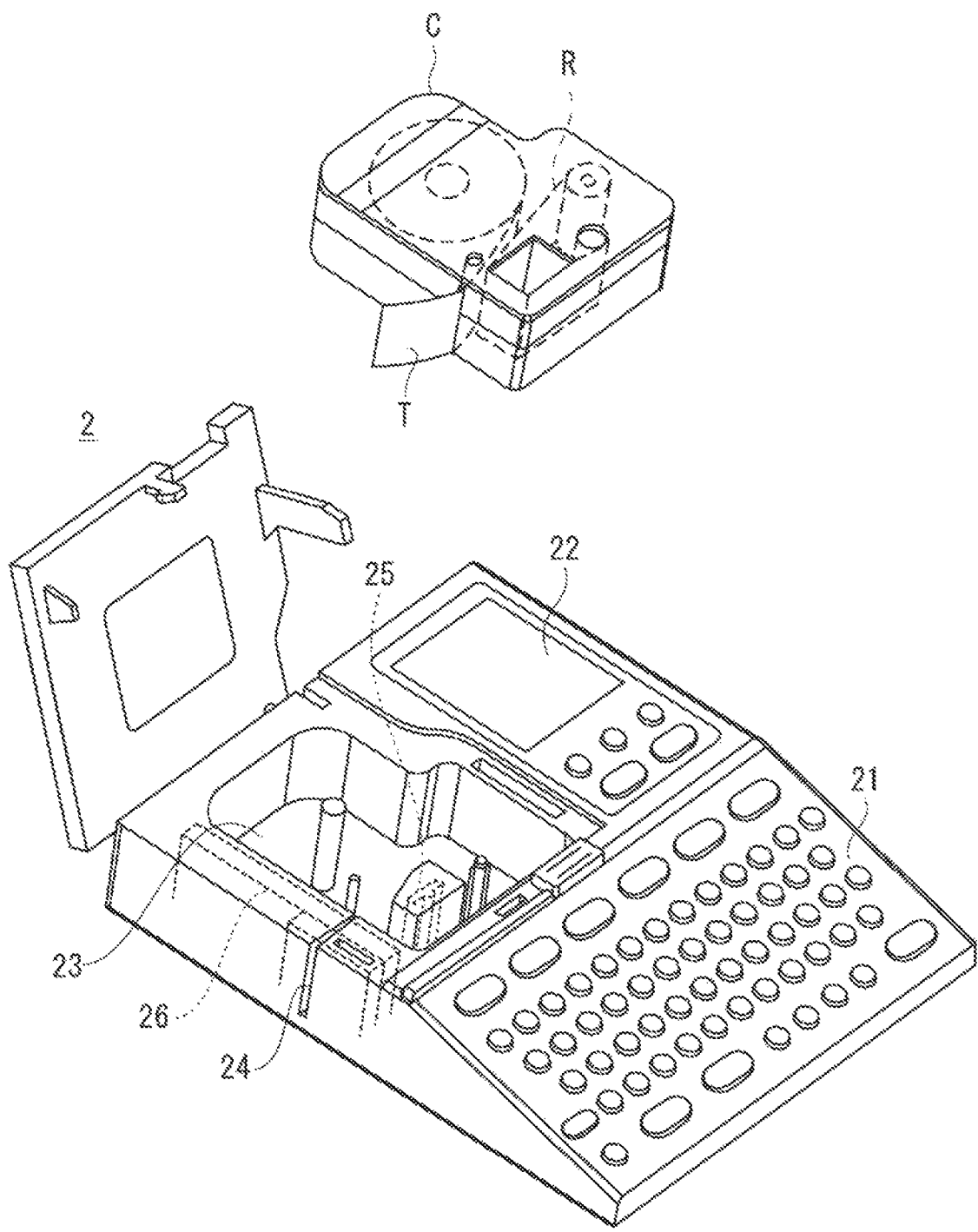
FIG. 2 is an exterior view of a tape printing device and a tape cartridge.

FIG. 2 is an exterior view of the tape printing device 2 and a tape cartridge C. The tape printing device 2 includes an operation key group 21, a printing device side display 22, a cartridge attachment unit 23, and a tape discharge port 24.

The operation key group 21 receives various user operations such as editing of the print data. The printing device side display 22 displays various types of information such as an operation screen for editing the print data. The tape printing device 2 can use the operation screen displayed on the printing device side display 22 to edit the print data for performing merge printing. However, in the present embodiment, the mobile terminal 1 edits the print data. That is, the tape printing device 2 receives the print data generated by the mobile terminal 1 and performs printing based on the received print data.

The tape cartridge C is detachably attached to the cartridge attachment unit 23. In a casing of the tape cartridge C, the tape T and an ink ribbon R are stored.

In the cartridge attachment unit 23, a thermal head 25 is disposed. The thermal head 25 is driven to generate heat according to the print data transmitted from the mobile terminal 1 in a state in which the tape cartridge C is attached to the cartridge attachment unit 23. As a result, ink of the ink ribbon R is transferred to the tape T and a print image PG based on the print data is printed on the tape T.

The printed tape T is discharged from the tape discharge port 24. A cutter 26 is disposed between the cartridge attachment unit 23 and the tape discharge port 24. The cutter 26 cuts the tape T in a width direction of the tape T so as to separate a printed portion of the tape T from the other portion of the tape T.

FIG. 3 is a block diagram illustrating a hardware configuration of the mobile terminal 1 and a hardware configuration of the tape printing device 2. The mobile terminal 1 includes the touch panel 11, a mobile terminal side communication unit 13, and a mobile terminal side control unit 14.

The touch panel 11 is used as a display unit and an operation unit. The touch panel 11 displays various types of information such as the operation screens D and receives various user operations. Although described later in detail, the operation screens D include a first operation screen D1 illustrated in FIG. 5, a second operation screen D2 illustrated in FIG. 6, a third operation screen D3 illustrated in FIG. 7, the fourth operation screen D4 illustrated in FIG. 8, a fifth operation screen D5 illustrated in FIG. 9, and a sixth operation screen D6 illustrated in FIG. 14. The first operation screen D1 transitions to the fifth operation screen D5 through the second to fourth operation screens D2 to D4 in the order of the screen numbers. The first, third, fourth, and fifth operation screens D1, D3, D4, and D5 other than the second operation screen D2 can transition to the sixth operation screen D6.

The mobile terminal side communication unit 13 communicates with the tape printing device 2 via the radio communication 5. For example, the mobile terminal side communication unit 13 transmits the print data to the tape printing device 2 and receives, from the tape printing device 2, cartridge information indicating the type of the tape cartridge C attached to the tape printing device 2.

The mobile terminal side control unit 14 includes a mobile terminal side central processing unit (CPU) 14a, a mobile terminal side read-only memory (ROM) 14b, and a mobile terminal side random-access memory (PAM) 14c.

The mobile terminal side CPU 14a loads various programs stored in the mobile terminal side ROM 14b into the mobile terminal side RAM 14c and executes the various programs to perform various types of control. The mobile terminal side control unit 14 may use a hardware circuit such as an application-specific integrated circuit (ASIC) as a processor, instead of the mobile terminal side CPU 14a. The processor may have a configuration in which one or more CPUs and the hardware circuit such as an ASIC collaborate with each other to operate.

The mobile terminal side ROM 14b is a rewritable ROM and stores an operating system (OS) 31, a tape printing application 32, and the spreadsheet application 33. The tape printing application 32 is an example of a "program".

The OS 31 is basic software for executing other applications. The tape printing application 32 is an application program for displaying the operation screens D, generating the print data, and communicating with the tape printing device 2. The spreadsheet application 33 is an application that performs a spreadsheet operation. In the present embodiment, the spreadsheet application 33 is used to generate the table data. The table data generated by the spreadsheet application 33 is stored in the mobile terminal side ROM 14b.

The mobile terminal side RAM 14c is used as a work area by the mobile terminal side CPU 14a to perform various types of control.

The tape printing device 2 includes a printing device side communication unit 41, a cartridge information reading unit 42, a printing unit 43, and a printing device side control unit 44.

The printing device side communication unit 41 communicates with the mobile terminal 1 via the radio communication 5.

The cartridge information reading unit 42 optically reads a code image attached as a label to the tape cartridge C attached to the cartridge attachment unit 23 or reads the cartridge information from a circuit board which is not illustrated having a memory element provided in the tape cartridge C. The cartridge information includes tape width information indicating a tape width of the tape T stored in the tape cartridge C.

The printing unit 43 is a mechanism that performs printing on the tape T. The printing unit 43 includes the thermal head 25, a feed motor 43a, and a cutter motor 43b. The thermal head 25 includes a plurality of heat generating elements and performs printing by thermally transferring the ink onto the tape T from the ink ribbon R. The feed motor 43a is a drive source that feeds the tape T and the ink ribbon R. The cutter motor 43b is a drive source that drives the cutter 26.

The printing device side control unit 44 includes a printing device side CPU 44a, a printing device side ROM 44b, and a printing device side RAM 44c.

The printing device side CPU 44a loads a control program such as firmware stored in the printing device side ROM 44b into the printing device side RAM 44c and executes the control program to performs various types of control. The printing device side control unit 44 may use a hardware circuit such as an ASIC as a processor, instead of the printing device side CPU 44a. The processor may have a configuration in which one or more CPUs and the hardware circuit such as an ASIC collaborate with each other to operate.

The printing device side CPU 44a uses the control program stored in the printing device side ROM 44b to perform printing on the tape T fed from the tape cartridge C based on the print data transmitted from the mobile terminal 1. The printing device side CPU 44a acquires the cartridge information via the cartridge information reading unit 42 and transmits the acquired cartridge information to the mobile terminal 1 upon receiving the print data from the mobile terminal 1 and upon receiving a cartridge information request signal.

Figure 4:
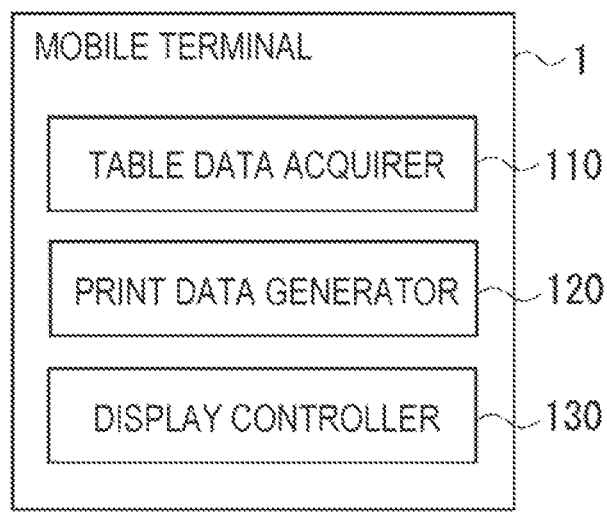
FIG. 4 is a block diagram illustrating a functional configuration of the mobile terminal.

FIG. 4 is a block diagram illustrating a functional configuration of the mobile terminal 1. The mobile terminal 1 includes a table data acquirer 110, a print data generator 120, and a display controller 130 as functional configurations. These functions are implemented by the mobile terminal side CPU 14a to execute the tape printing application 32.

The table data acquirer 110 acquires the table data stored in the mobile terminal side ROM 14b. The table data is constituted by columns and rows. The table data acquirer 110 may acquire the table data from an external device that can communicate with the mobile terminal 1.

When the user selects the text option 97 on the fourth operation screen D4 illustrated in FIG. 8 described later, the print data generator 120 generates print data including an unconverted image in which the information stored in the table data is not converted into other information. When the user selects the one-dimensional code option 98 on the fourth operation screen D4, the print data generator 120 generates the print data including a first code image obtained by converting the information stored in the table data into a one-dimensional code image. When the user selects the two-dimensional code option 99 on the fourth operation screen D4, the print data generator 120 generates the print data including a second code image obtained by converting the information stored in the table data into a two-dimensional code image.

The print data generator 120 generates a plurality of print data items so that a plurality of print images PG based on a plurality of information items stored in a column selected by the user from the table data are printed on the tape T. For example, when information of two rows is stored in the column selected by the user, the print data generator 120 generates first print data for printing a first print image PG based on the information of the first row on the tape T, and second print data for printing a second print image PG based on the information of the second row on the tape T. The user selects a column from the table data on the third operation screen D3 illustrated in FIG. 7 described later. The third operation screen D3 is an example of a "first screen".

Figure 16:
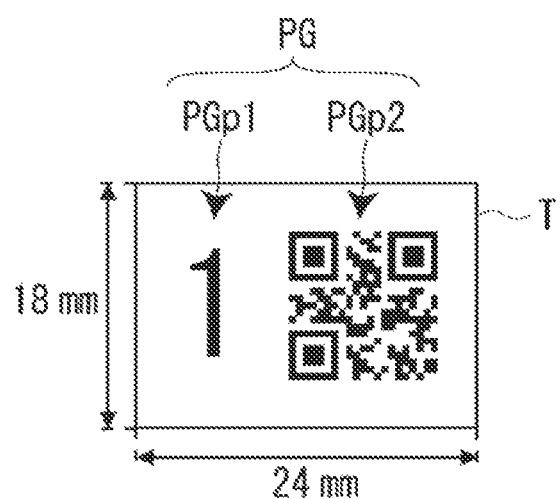
FIG. 16 is a diagram illustrating an example of a printed tape.

When the user creates a plurality of blocks B each indicating any one of the unconverted image, the first code image, and the second code image, the print data generator 120 generates a plurality of print data items so that a plurality of partial print images PGp illustrated in FIG. 16 and corresponding to the plurality of blocks B are printed on the tape T. For example, it is assumed that the user creates a first block B1 and a second block B2 for which at least one of a column selected from the table data and an option selected from the plurality of options is different from at least one of a column selected from the table data for the first block B1 and an option selected from the plurality of options for the first block B1. In this case, the print data generator 120 generates a plurality of print data items so that a first partial print image PGp1 corresponding to the first block B1 and a second partial print image PGp2 corresponding to the second block B2 are printed on the tape T.

The display controller 130 displays, on the touch panel 11, the third operation screen D3 including a first print image region E12 in which a tape image TI that is an image of the tape T is displayed, and a first table data region E13 in which the table data is displayed. The third operation screen D3 is displayed when the table data is selected on the second operation screen D2. As described above, the third operation screen D3 is an example of the "first screen". The display controller 130 displays the third operation screen D3 on the touch panel 11 such that the first print image region E12 has an area larger than the area of the first table data region E13 and that the ratio of the area of the first table data region E13 to the area of the first print image region E12 is not changed by a user operation.

The display controller 130 displays, on the touch panel 11, the fourth operation screen D4 including a second print image region E16 in which the tape image TI is displayed, the option region E17 in which a plurality of options including the text option 97, the one-dimensional code option 98, and the two-dimensional code option 99 are displayed, and the second table data region E18 in which the table data is displayed.

When the user selects any one of the columns from the table data displayed in the first table data region E13 of the third operation screen D3 and performs a predetermined operation, the display controller 130 displays the fourth operation screen D4 on the touch panel 11. In this case, the display controller 130 displays the fourth operation screen D4 on the touch panel 11 by setting the first print image region E12 of the third operation screen D3 to the second print image region E16, setting the first table data region E13 of the third operation screen D3 to the second table data region E18, and displaying the option region E17 in a pop-up screen.

When the user selects any one of the plurality of options displayed in the option regions E17, the display controller 130 displays, on the touch panel 11, the fifth operation screen D5 including a third print image region E22 in which the print image PI of the tape T is displayed and an edit menu region E23 in which an edit menu for the print data is displayed. The fifth operation screen D5 is an example of a "third screen".

The display controller 130 displays a block B indicating any one of the unconverted image, the first code image, and the second code image as a part of the print image PI in the third print image region E22 of the fifth operation screen D5 according to an option selected from among the plurality of options. For example, when the user selects the text option 97, the display controller 130 displays, as a part of the print image PI, a block B indicating an unconverted image in which any information included in information stored in a column selected from the table data is not converted into other information. When the user selects the one-dimensional code option 98, the display controller 130 displays, as a part of the print image PI, a block B indicating a first code image obtained by converting any information included in the information stored in the column selected from the table data into a one-dimensional code. When the user selects the two-dimensional code option 99, the display controller 130 displays, as a part of the print image PI, a block B indicating a second code image obtained by converting any information included in the information stored in the column selected from the table data into a two-dimensional code.

Next, the operation screens D displayed and operations on the operation screens D are described using specific examples with reference to FIGS. 5 to 15. In the following description, it is assumed that the user taps the position of an option displayed on the touch panel 11 to select the option and taps the position of a button displayed on the touch panel 11 to select the button.

Figure 5:
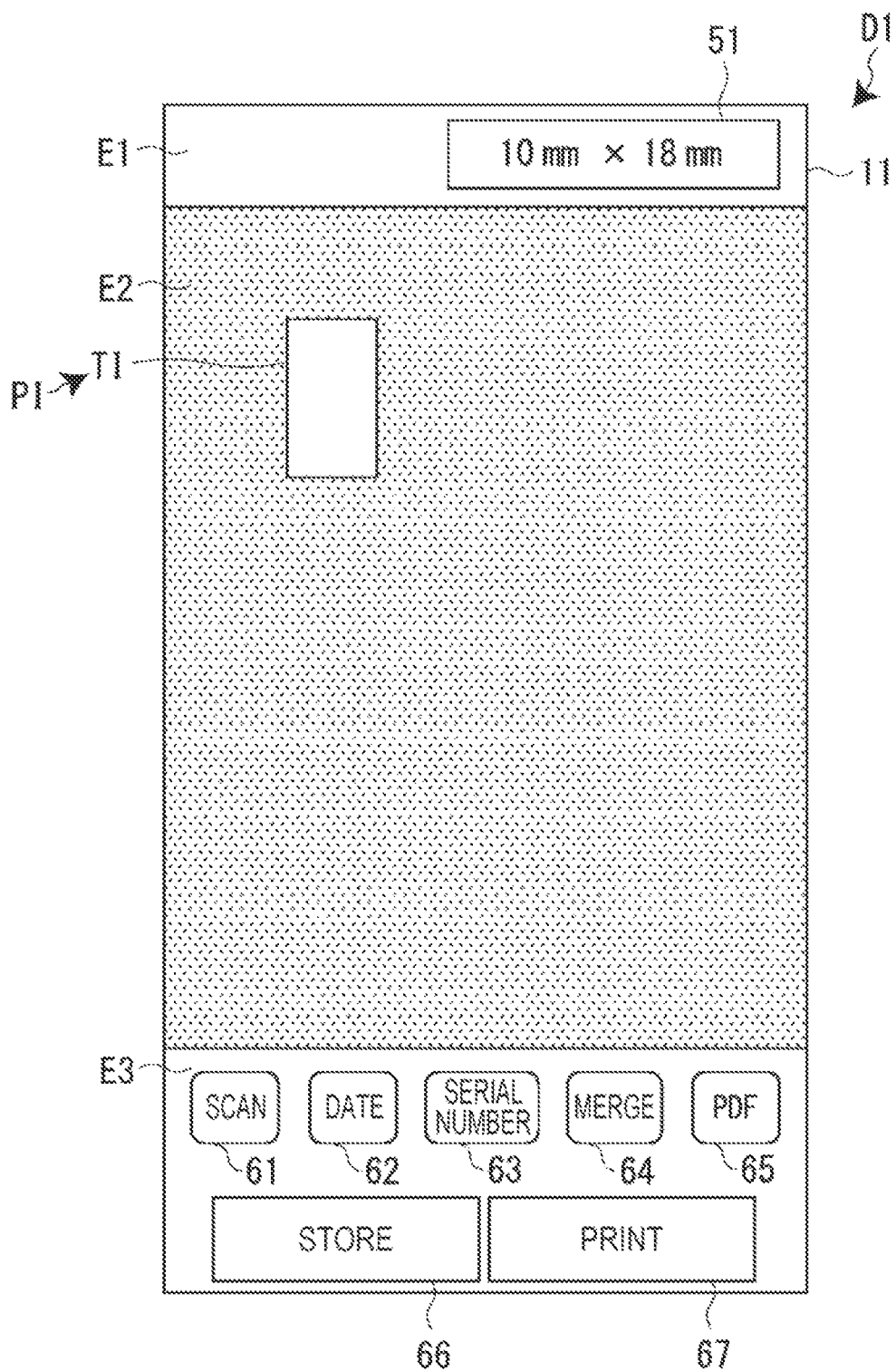
FIG. 5 is a diagram illustrating an example of a first operation screen.

FIG. 5 is a diagram illustrating an example of the first operation screen D1 displayed. After the start of the tape printing application 32, the mobile terminal 1 displays a menu screen not illustrated on the touch panel 11. When a predetermined menu is selected from among a plurality of menus on the menu screen, the mobile terminal 1 displays the first operation screen D1 on the touch panel 11.

On the menu screen, a cartridge information acquisition menu for acquiring the cartridge information from the tape printing device 2 is displayed. When the cartridge information acquisition menu is selected on the menu screen, the mobile terminal 1 transmits a cartridge information request signal to the tape printing device 2 and acquires the cartridge information from the tape printing device 2. It is assumed that the cartridge information acquired in this case includes tape width information indicating a tape width of "18 mm".

The first operation screen D1 includes an initial tape information region E1, an initial print image region E2, and an operation menu region E3.

In the initial tape information region E1, initial tape size information 51 is displayed. The initial tape size information 51 indicates a tape length and a tape width of the tape T to be created based on the print data edited in the initial print image region E2. The mobile terminal 1 displays the tape width indicated in the initial tape size information 51 based on the tape width information included in the cartridge information acquired from the tape printing device 2. The mobile terminal 1 displays the tape length indicated in the initial tape size information 51 based on the print data edited in the initial print image region E2. That is, the tape length indicated in the initial tape size information 51 is a length corresponding to the tape length of the tape image TI displayed in the initial print image region E2.

Since the first operation screen D1 illustrated in FIG. 5 indicates a state in which no editing is performed in the initial print image region E2, the mobile terminal 1 displays, as the tape length indicated in the initial tape size information 51, "10 mm" that is a length corresponding to the shortest length of the tape image TI. In addition, the mobile terminal 1 displays, as the tape width indicated in the initial tape size information 51, the tape width "18 mm" based on the cartridge information acquired from the tape printing device 2.

Figure 9:
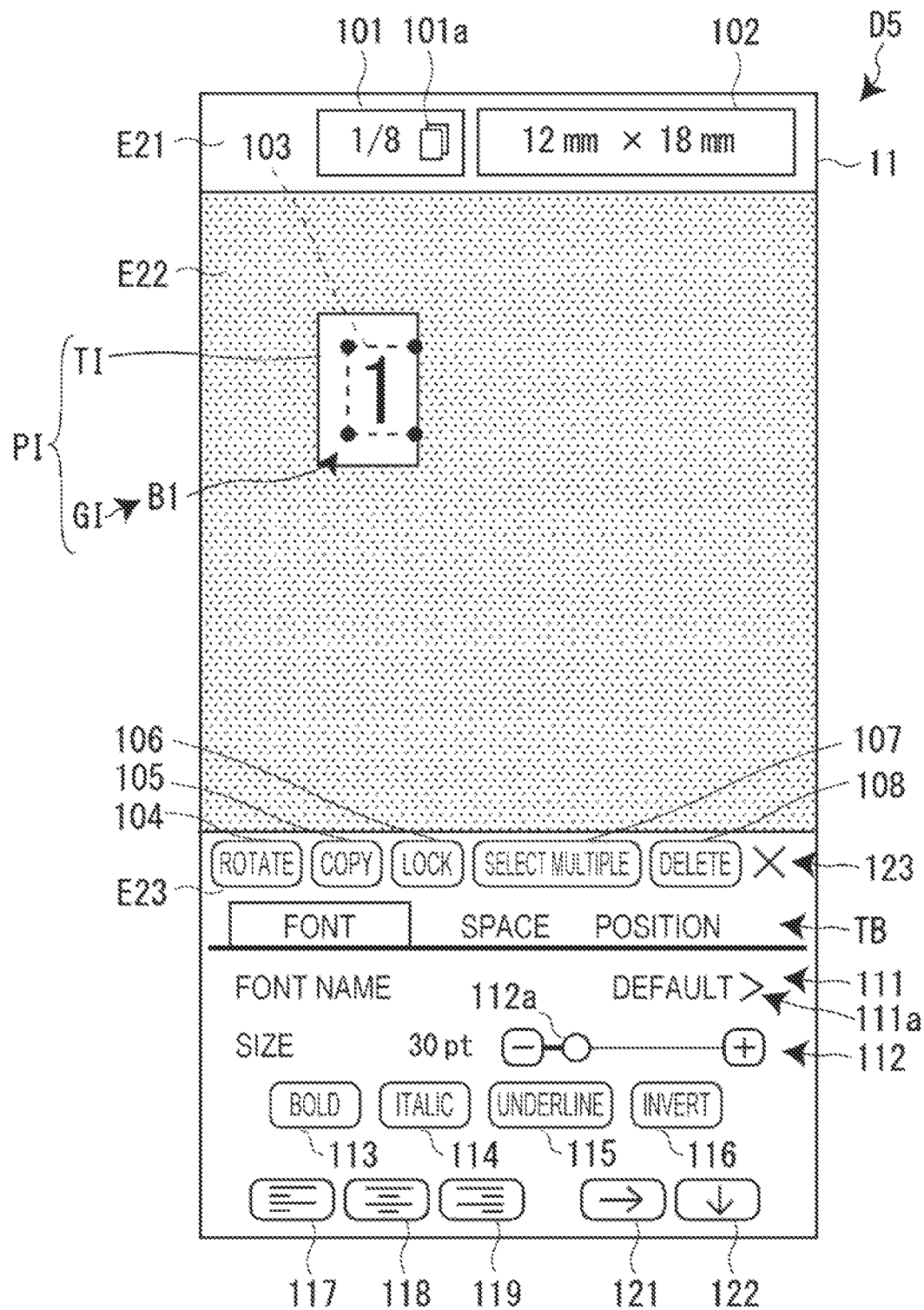
FIG. 9 is a diagram illustrating an example of a fifth operation screen.

In the initial print image region E2, the print image PI of the tape T is displayed. The print image PI includes the tape image TI that is an image of the tape T, and an image GI that is an image of the print image PG to be printed on the tape T. FIG. 9 and the like illustrate the image GI. As described above, since the first operation screen D1 illustrated in FIG. 5 indicates a state in which no editing is performed in the initial print image region E2, the mobile terminal 1 displays only the tape image TI as the print image PI.

In the operation menu region E3, a scan button 61, a date button 62, a serial number button 63, a merge button 64, a PDF button 65, a store button 66, and a print button 67 are displayed.

The scan button 61 is a button for inputting a scanned image. When the scan button 61 is selected, the mobile terminal 1 starts a camera not illustrated and displays, in the initial print image region E2, an image GI based on a scanned image captured by the camera.

The date button 62 is a button for inputting a date. When the date button 62 is selected, the mobile terminal 1 acquires a current date from a calendar application not illustrated and displays an image GI indicating the acquired current date in the initial print image region E2.

The serial number button 63 is a button for inputting a serial number. When the serial number button 63 is selected, the mobile terminal 1 displays a serial number setting screen not illustrated and receives a serial number set by the user. The mobile terminal 1 displays an image GI indicating the initial value of the serial number in the initial print image region E2 based on the setting on the serial number setting screen.

The merge button 64 is a button for performing merge printing. When the merge button 64 is selected, the mobile terminal 1 displays a table file selection screen not illustrated. When the user selects a table file on the table file selection screen, the mobile terminal 1 displays the second operation screen D2 illustrated in FIG. 6 on the touch panel 11. The table file includes the table data and metadata such as the name of the file.

The PDF button 65 is a button for inputting a PDF image. When the PDF button 65 is selected, the mobile terminal 1 displays a PDF file selection screen not illustrated and receives selection of a PDF file by the user. The mobile terminal 1 reads the PDF file selected by the user and displays an image GI based on a PDF image of the read PDF file in the initial print image region E2.

The store button 66 is a button for storing a result of editing the print data in the initial print image region E2. When the store button 66 is selected, the mobile terminal 1 stores, in the mobile terminal side ROM 14*b*, the result of editing the print data in the initial print image region E2.

The print button 67 is a button for performing printing. When the print button 67 is selected, the mobile terminal 1 generates print data based on a result of editing the print data in the initial print image region E2 and transmits the generated print data to the tape printing device 2.

When the tape printing device 2 receives the print data transmitted by the mobile terminal 1, the tape printing device 2 reads the cartridge information from the tape cartridge C and transmits the read cartridge information to the mobile terminal 1. When the tape width indicated in the cartridge information acquired by the mobile terminal 1 is different from the tape width displayed in the initial tape size information 51, the mobile terminal 1 performs an error notification.

Figure 6:
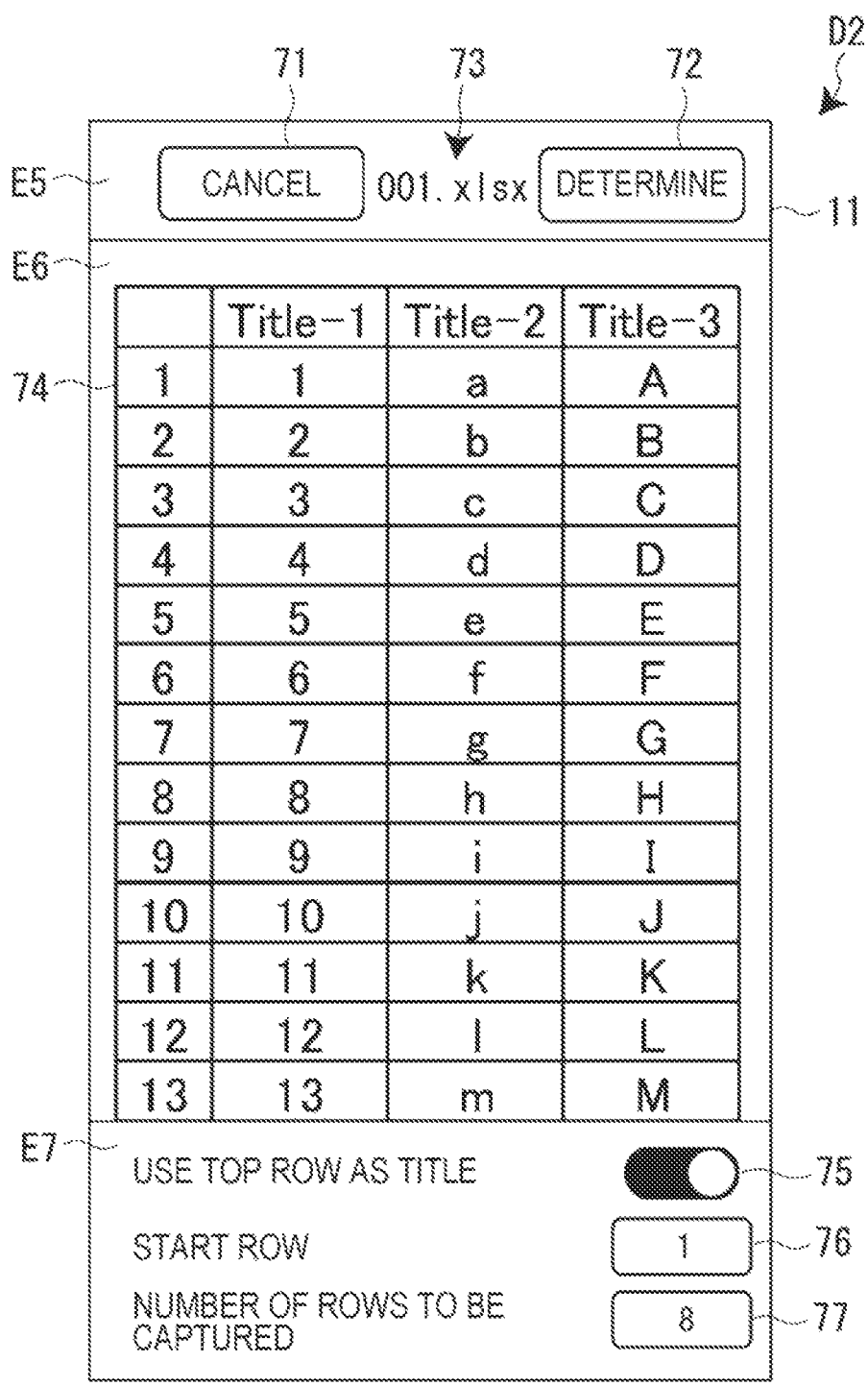
FIG. 6 is a diagram illustrating an example of a second operation screen.

FIG. 6 is a diagram illustrating an example of the second operation screen D2 displayed. As described above, when the table file is selected on the table file selection screen not illustrated, the mobile terminal 1 displays the second operation screen D2 on the touch panel 11. The second operation screen D2 includes a select button region E5, a table data check region E6, and a table data setting region E7.

In the select button region E5, a cancel button 71, a determine button 72, and a table file name 73 are displayed.

The cancel button 71 is a button for canceling the selection of a table file. When the cancel button 71 is selected, the mobile terminal 1 hides the second operation screen D2 and displays the first operation screen D1 on the touch panel 11.

The determine button 72 is a button for determining table data and a setting for the table data. When the determine button 72 is selected, the mobile terminal 1 determines, as table data to be used for merge printing, table data displayed in the table data check region E6 and determines, as a setting for the table data, a setting in the table data setting region E7.

The table file name 73 is a file name included in a table file selected by the user on the table file selection screen not illustrated.

In the table data check region E6, selected table data 74 that is table data included in the table file selected by the user on the table file selection screen not illustrated is displayed. The example illustrated in FIG. 6 indicates the selected table data 74 including information of three columns and thirteen rows or more. The top row of the selected table data 74 is information indicating a column title. The top column of the selected table data 74 is information indicating a row number. When the user performs a scroll operation in the table data check region E6, the mobile terminal 1 scrolls the selected table data 74 displayed in the table data check region E6 in a row direction of the selected table data 74 and a column direction of the selected table data 74. The scroll operation is an operation of flicking or swiping the touch panel 11.

In the table data setting region E7, a title selection field 75, a start row input field 76, and a field 77 for inputting the number of rows to be captured are displayed.

The title selection field 75 is a button for selecting whether the top row of the table data is used as a title row. The example illustrated in FIG. 6 indicates a setting in which the top row of the table data is used as the title row. When the top row of the table data is set to be used as the title row, the mobile terminal 1 displays a column title in the first table data region E13 illustrated in FIG. 7 described later and the second table data region E18 illustrated in FIG. 8 described later. When the top row of the table data is set not to be used as the title row, the mobile terminal 1 displays the table data without a row indicating a column title in the first table data region E13 and the second table data region E18.

The start row input field 76 is a button for selecting a start row of the table data. The field 77 for inputting the number of rows to be captured is a button for selecting the number of rows to be captured from the table data. As illustrated in FIG. 6, when the start row is set to "1" and the number of rows to be captured is set to "8", the mobile terminal 1 captures the first to eighth rows of the table data. In addition, the mobile terminal 1 displays the table data of the captured eight rows in the first table data region E13 and the second table data region E18, which are described later.

Figure 7:
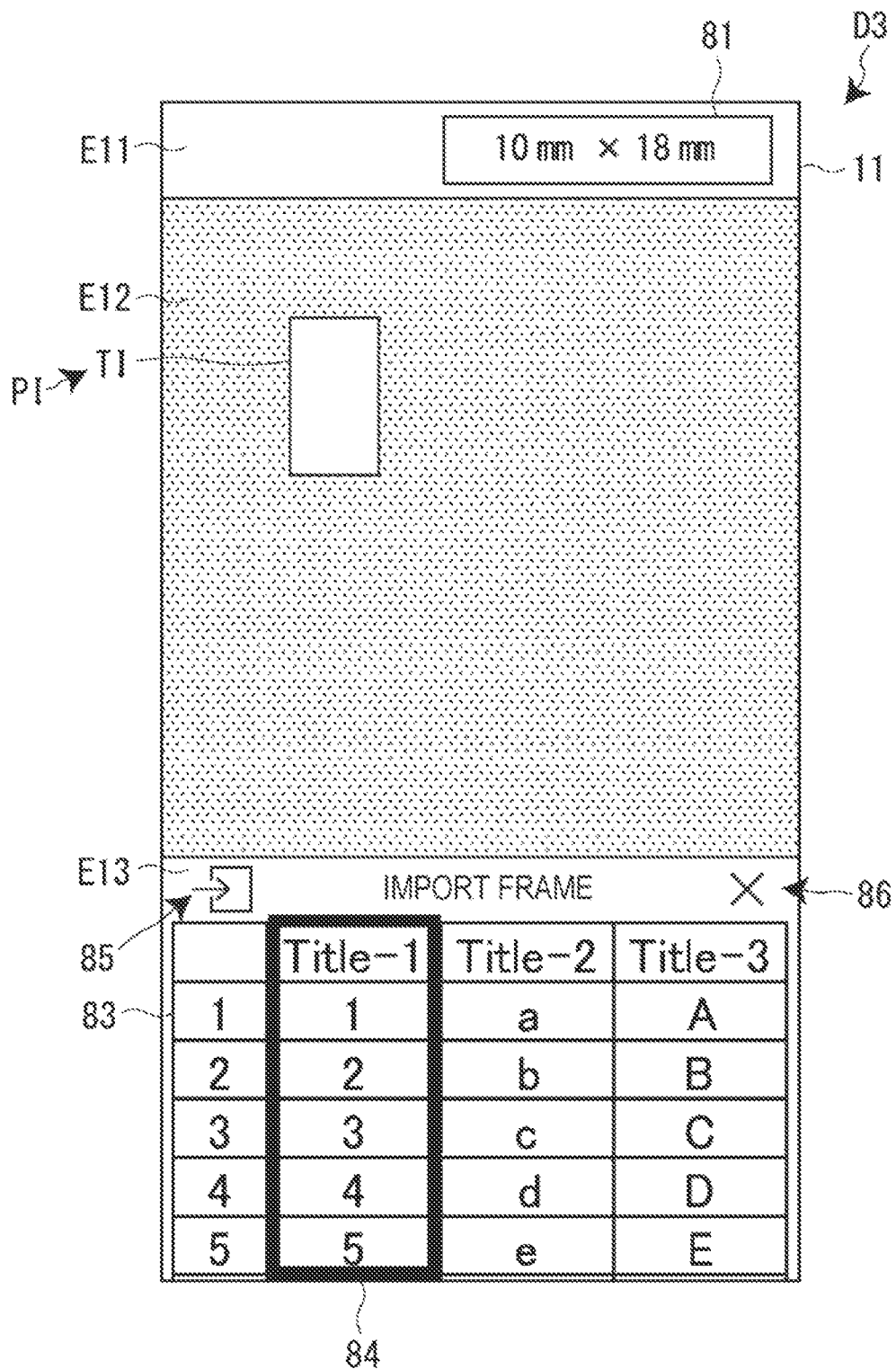
FIG. 7 is a diagram illustrating an example of a third operation screen.

FIG. 7 is a diagram illustrating an example of the third operation screen D3 displayed. When the determine button 72 is selected on the second operation screen D2, the mobile terminal 1 displays the third operation screen D3 on the touch panel 11. The third operation screen D3 includes a first tape information region E11, the first print image region E12, and the first table data region E13.

As described above, the mobile terminal 1 displays the third operation screen D3 such that the first print image region E12 has an area larger than the area of the first table data region E13. In addition, the mobile terminal 1 displays the third operation screen D3 such that the ratio of the area of the first print image region E12 to the area of the first table data region E13 is not changed by moving a boundary line between the first print image region E12 and the first table data region E13 by a user operation or the like.

In the first tape information region E11, first tape size information 81 is displayed. The first tape size information 81 indicates a tape length and a tape width of the tape T to be created based on the print data edited in the first print image region E12.

In the first print image region E12, the print image PI of the tape T is displayed. Since the third operation screen D3 illustrated in FIG. 7 indicates a state in which no editing is performed in the first print image region E12, only the tape image TI is displayed as the print image PI in the first print image region E12.

In the first table data region E13, determined table data 83, a first import button 85, and a first close button 86 are displayed.

The determined table data 83 is table data of eight rows included in the selected table data 74 and determined as a target to be captured on the second operation screen D2. The example illustrated in FIG. 7 indicates a state in which five rows among the eight rows of the table data are displayed in the first table data region E13. When the user performs a scroll operation on the first table data region E13, the mobile terminal 1 scrolls the determined table data 83 displayed in the first table data region E13 in a row direction and a column direction of the determined table data 83. In addition, the example illustrated in FIG. 7 indicates a state in which the first column of the determined table data 83 is selected as a selected column. The mobile terminal 1 adds a selection frame 84 to the selected column and displays the selected column with the selection frame 84 added thereto.

The first import button 85 is a button for capturing information stored in the selected column of the determined table data 83. When the first import button 85 is operated in a state in which the selection frame 84 is displayed in the determined table data 83, the mobile terminal 1 captures the information stored in the selected column as information to be used for merge printing. The operation of the first import button 85 is an example of a "predetermined operation". The operation of the first import button 85 is performed by tapping the position of the first import button 85 displayed. In addition, "the capturing of the information stored in the selected column" means that the information stored in the selected column is stored in a predetermined storage region of the mobile terminal side RAM 14c.

The first close button 86 is a button for hiding the first table data region E13. When the first close button 86 is operated, the mobile terminal 1 hides the first table data region E13 to display the first operation screen D1 illustrated in FIG. 5 on the touch panel 11.

Figure 8:
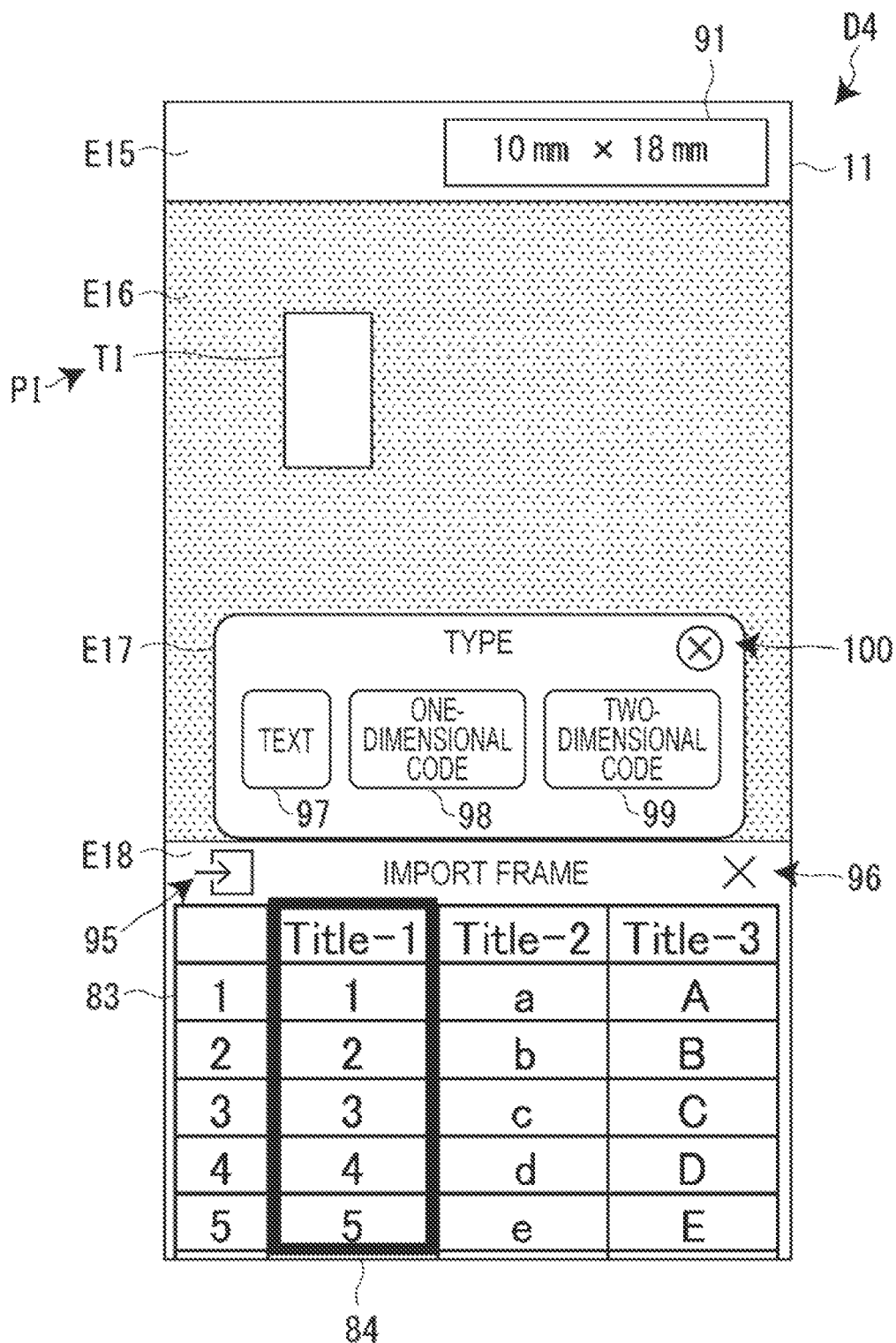
FIG. 8 is a diagram illustrating an example of a fourth operation screen.

FIG. 8 is a diagram illustrating an example of the fourth operation screen D4 displayed. When the first import button 85 is operated in a state in which the selection frame 84 is displayed in the determined table data 83 on the third operation screen D3, the mobile terminal 1 displays the fourth operation screen D4 on the touch panel 11. The fourth operation screen D4 includes a second tape information region E15, the second print image region E16, the option region E17, and the second table data region E18. The mobile terminal 1 displays the fourth operation screen D4 on the touch panel 11 by setting the first print image region E12 of the third operation screen D3 to the second print image region E16, setting the first table data region E13 of the third operation screen D3 to the second table data region E18, and displaying the option region E17 in a pop-up screen.

In the second tape information region E15, second tape size information 91 is displayed. The second tape size information 91 indicates a tape length and a tape width of the tape T to be created based on the print data edited in the second print image region E16.

In the second print image region E16, the print image PI of the tape T is displayed. Since the fourth operation screen D4 illustrated in FIG. 8 indicates a state in which no editing is performed in the second print image region E16, only the tape image TI is displayed as the print image PI in the second print image region E16.

In the option region E17, the text option 97, the one-dimensional code option 98, the two-dimensional code option 99, and a pop-up hide button 100 are displayed. When any one of the text option 97, the one-dimensional code option 98, and the two-dimensional code option 99 is selected, the mobile terminal 1 displays the fifth operation screen D5 illustrated in FIG. 9 on the touch panel 11. When the text option 97 is selected, the mobile terminal 1 displays a block B of a block type "text" in the third print image region E22 of the fifth operation screen D5, as illustrated in FIG. 9. When the one-dimensional code option 98 is selected, the mobile terminal 1 displays a block B of a block type "one-dimensional code image" in the third print image region E22 of the fifth operation screen D5. When the two-dimensional code option 99 is selected, the mobile terminal 1 displays a block B of a block type "two-dimensional code image" in the third print image region E22 of the fifth operation screen D5. In the third print image region E22 of the fifth operation screen D5, these blocks B are displayed while being superimposed on the tape image T1.

The pop-up hide button 100 is a button for hiding the option region E17 that is a pop-up screen. When the pop-up hide button 100 is selected, the mobile terminal 1 hides the option region E17 to display the third operation screen D3 illustrated in FIG. 7 on the touch panel 11.

In the second table data region E18, determined table data 83, a second import button 95, and a second close button 96 are displayed.

The determined table data 83 displayed in the second table data region E18 is the same as or similar to the determined table data 83 displayed in the first table data region E13 of the third operation screen D3. The mobile terminal 1 can accept a change from the selected column in the second table data region E18. When a column is newly selected instead of the above-described selected column in the second table data region E18 and the second import button 95 is operated, the mobile terminal 1 captures information stored in the newly selected column. That is, when the column is newly selected instead of the above-described selected column and the second import button 95 is operated, the mobile terminal 1 rewrites the information stored in the newly selected column over the information stored in the predetermined storage region of the mobile terminal side RAM 14*c*. When the second import button 95 is operated on the fourth operation screen D4, the mobile terminal 1 maintains the fourth operation screen D4 displayed.

The mobile terminal 1 may not be configured to accept a change from the selected column in the second table data region E18. In this case, when the pop-up hide button 100 is selected, the mobile terminal 1 may hide the fourth operation screen D4, display the third operation screen D3, and accept a change from the selected column on the third operation screen D3.

The second close button 96 is a button for hiding the option region E17 and the second table data region E18. When the second close button 96 is operated, the mobile terminal 1 displays the first operation screen D1 illustrated in FIG. 5 on the touch panel 11 by hiding the option region E17 and the second table data region E18.

FIG. 9 is a diagram illustrating an example of the fifth operation screen D5 displayed. When any option is selected from among the plurality of options displayed in the option region E17 of the fourth operation screen D4, the mobile terminal 1 displays the fifth operation screen D5 on the touch panel 11. The example illustrated in FIG. 9 indicates a state in which the text option 97 is selected in the option region E17 of the fourth operation screen D4. The fifth operation screen D5 includes a third tape information region E21, the third print image region E22, and the edit menu region E23.

In the third tape information region E21, third tape number information 101 and third tape size information 102 are displayed. The third tape number information 101 indicates the number of tapes T to be created and information indicating which tape T the print image PI displayed in the third print image region E22 corresponds to. In the example illustrated in FIG. 9, a fraction "⅛" is displayed in the third tape information region E21. The denominator of the fraction in the third tape information region E21 indicates the number of tapes T to be created. The numerator of the fraction in the third tape information region E21 indicates a tape T corresponding to the print image PI displayed in the third print image region E22. Therefore, in the example illustrated in FIG. 9, the number of tapes T to be created is "8" and the print image PI of the first tape T is displayed in the third print image region E22.

The third tape number information 101 includes a third list display icon 101*a*. The third list display icon 101*a* is a button for displaying the sixth operation screen D6 described later. When the third list display icon 101*a* is selected, the mobile terminal 1 displays, on the touch panel 11, the sixth operation screen D6 on which print images PI for the number of tapes indicated in the third tape information region E21 are displayed.

The third tape size information 102 indicates a tape length and a tape width of the tape T to be created based on the print data edited in the third print image region E22.

In the third print image region E22, the print image PI of the tape T is displayed. The print image PI is displayed by superimposing the image GI on the tape image TI. The tape image TI is an image of the tape T. The image GI is an image of the print image PG. In the example illustrated in FIG. 9, a first block B1 indicating text "1" that is included in information stored in the first column selected from the determined table data 83 and is information of the top row of the determined table data 83 is displayed as the image GI. The example illustrated in FIG. 9 indicates a state in which the first block B1 is selected. The mobile terminal 1 adds a handle 103 to the first block B1 in a selected state and displays the first block B1 with the handle 103 added thereto in the selected state.

In the edit menu region E23, a rotate button 104, a copy button 105, a lock button 106, a select multiple button 107, and a delete button 108 are displayed. These edit menus are displayed in the edit menu region E23 regardless of the type of a block B in a selected state in the third print image region E22. An edit menu that is not these edit menus and is to be displayed in the edit menu region E23 differs depending on the type of a block B in a selected state.

When the rotate button 104 is selected, the mobile terminal 1 rotates a block B in a selected state in the third print image region E22, that is, the block B with the handle 103 added thereto clockwise by 90°, for example. The direction in which the block B is rotated and the angle at which the block B is rotated are arbitrary. When the copy button 105 is selected, the mobile terminal 1 copies a block B in a selected state in the third print image region E22 and displays the newly copied block B on the tape image TI. When the lock button 106 is selected, the mobile terminal 1 disables one or both of the movement and editing of a block B in a selected state in the third print image region E22. When the select multiple button 107 is selected, the mobile terminal 1 sets all blocks B displayed in the third print image region E22 to a selected state. That is, when the select multiple button 107 is selected, the mobile terminal 1 adds a handle 103 to all the blocks B displayed in the third print image region E22 and displays the blocks B with the handle 103 added thereto. When the delete button 108 is selected, the mobile terminal 1 deletes a block B in a selected state in the third print image region E22.

In the edit menu region E23, a third close button 123 is displayed. The third close button 123 is a button for hiding the edit menu region E23. When the third close button 123 is operated, the mobile terminal 1 hides the edit menu region E23 to display the first operation screen D1 on the touch panel 11. When the third print image region E22 is tapped other than when the third close button 123 is operated, the mobile terminal 1 hides the edit menu region E23.

In the edit menu region E23, a tab display field TB, a font selection field 111, and a size change field 112 are displayed. These edit menus are displayed when the type of a block B in a selected state is "text".

When the type of a block B in a selected state is a "one-dimensional code image", a menu for setting the type of a one-dimensional code, the size of a first code image, and the like is displayed as an edit menu. When the type of a block B in a selected state is a "two-dimensional code image", a menu for setting the type of a two-dimensional code, the size of a second code image, an error correction rate, and the like is displayed as an edit menu.

The tab display field TB includes a "font" tab, an "space" tab, and a "position" tab. The example illustrated in FIG. 9 indicates a state in which the "font" tab is selected in the tab display field TB. Edit menus described later are included in a font edit menu that is displayed when the "font" tab is selected. When the "space" tab is selected, the mobile terminal 1 displays an edit menu for editing a space between blocks B, instead of the font edit menu. When the "position" tab is selected, the mobile terminal 1 displays an edit menu for editing the position of a block B on the tape image TI, instead of the font edit menu.

The font selection field 111 is a selection field for selecting the type of a font for a block B in a selected state. When a right arrow icon 111a of the font selection field 111 is selected, the mobile terminal 1 displays a font menu not illustrated. When any font is selected from the font menu, the mobile terminal 1 displays a font name of the selected font in the font selection field 111. In addition, when the font is selected from the font menu, the mobile terminal 1 changes a font of a block B in a selected state in the third print image region E22 to the selected font.

The size change field 112 is a change field for changing a font size of a block B in a selected state. When an operator 112a of the size change field 112 is moved toward a positive direction, the mobile terminal 1 increases the font size of the block B in the selected state. When the operator 112a of the size change field 112 is moved toward a negative direction, the mobile terminal 1 reduces the font size of the block B in the selected state. In addition, the mobile terminal 1 displays, in the size change field 112, the value of a font size set by the operation of the operator 112a. When a font size is selected, the mobile terminal 1 changes the font size of the block B in the selected state to the selected font size in the third print image region E22.

In the edit menu region E23, a bold button 113, an italic button 114, an underline button 115, and an invert button 116 are displayed as a part of the font edit menu. Regarding each of these edit menus, every time the button is selected, the mobile terminal 1 switches between reflection and non-reflection of editing corresponding to the selected button.

When the bold button 113 is selected, the mobile terminal 1 makes text of a block B in a selected state bold. When the italic button 114 is selected, the mobile terminal 1 makes text of a block in a selected state italic. When the underline button 115 is selected, the mobile terminal 1 adds an underline to text of a block in a selected state and displays the text with the underline added thereto. When the invert button 116 is selected, the mobile terminal 1 inverts a color of text of a block B in a selected state and a color of a background of the block B.

In the edit menu region E23, a left align button 117, a center align button 118, a right align button 119, a horizontal writing button 121, and a vertical writing button 122 are displayed as a part of the font edit menu.

Any one of the left align button 117, the center align button 118, and the right align button 119 is selected. When text of a plurality of rows is included in a block B in a selected state and the left align button 117 is selected, the mobile terminal 1 aligns the text of the plurality of rows to the left. When text of a plurality of rows is included in a block B in a selected state and the center align button 118 is selected, the mobile terminal 1 centers the text of the plurality of rows. When text of a plurality of rows is included in a block B in a selected state and the right align button 119 is selected, the mobile terminal 1 aligns the text of the plurality of rows to the right.

Either the horizontal writing button 121 or the vertical writing button 122 is selected. When the horizontal writing button 122 is selected, the mobile terminal 1 horizontally aligns text included in a block B in a selected state. When the vertical writing button 122 is selected, the mobile terminal 1 vertically aligns text included in a block B in a selected state.

Figure 10:
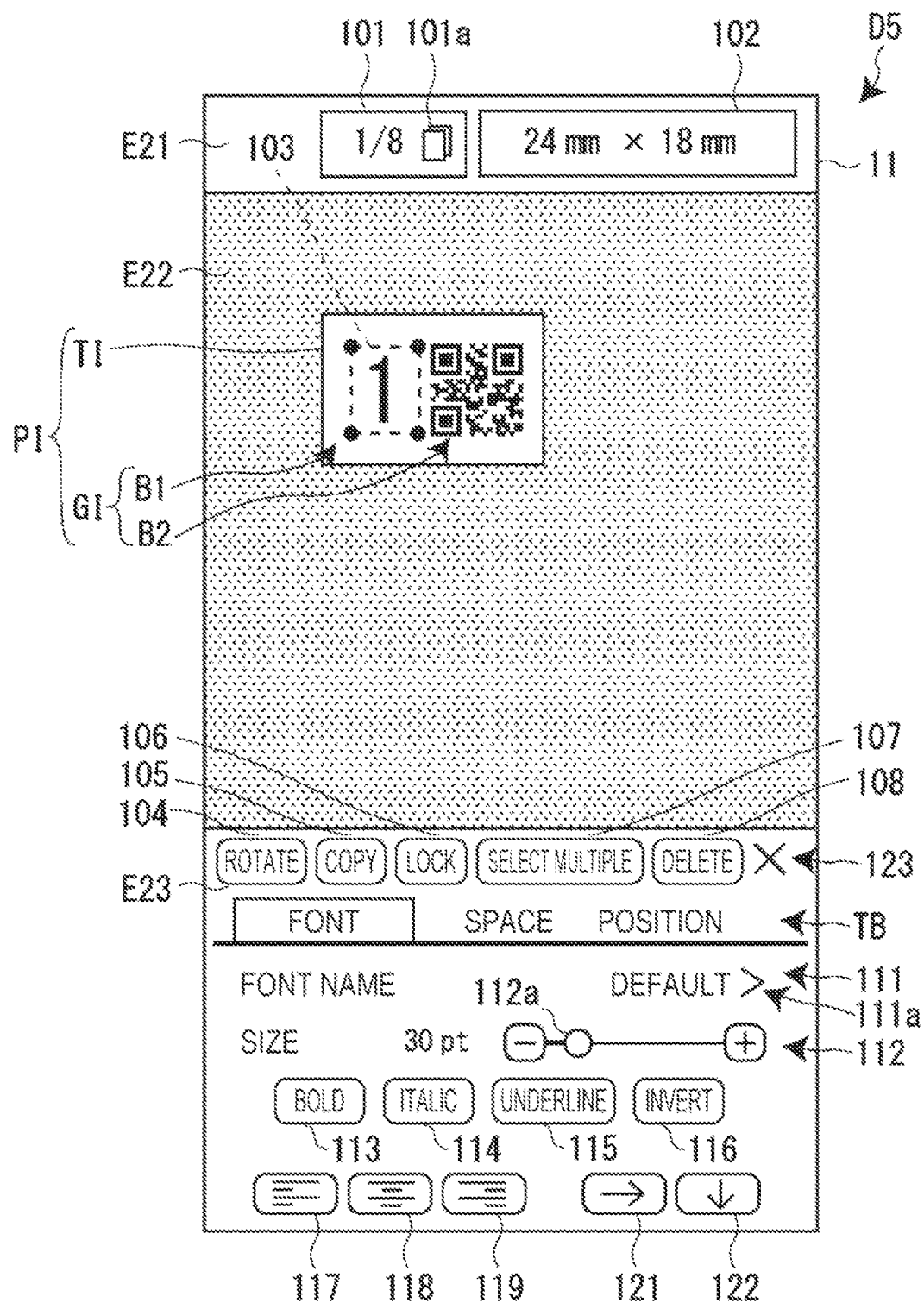
FIG. 10 is a diagram illustrating another example of the fifth operation screen.
Figure 11:
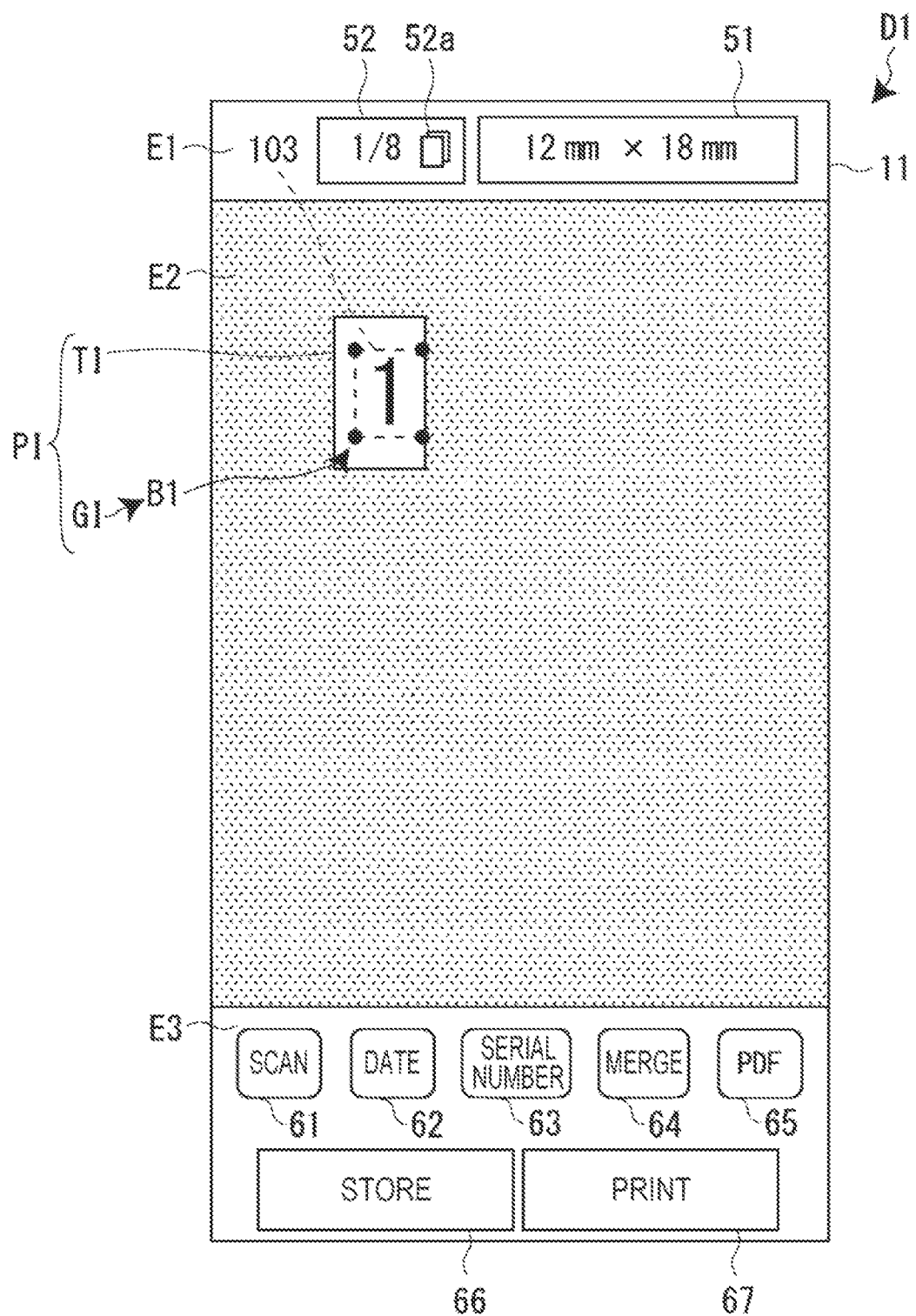
FIG. 11 is a diagram illustrating another example of the first operation screen.

FIG. 10 is a diagram illustrating an example of the displayed fifth operation screen D5 that is different from the example illustrated in FIG. 9. A procedure for displaying the fifth operation screen D5 illustrated in FIG. 10 is described with reference to FIGS. 11 to 13. When the third close button 123 is operated on the fifth operation screen D5 illustrated in FIG. 9, the mobile terminal 1 displays the first operation screen D1 illustrated in FIG. 11 on the touch panel 11. The initial tape information region E1 and the initial print image region E2 that are displayed on the first operation screen D1 illustrated in FIG. 11 are the same as or similar to the third tape information region E21 and the third print image region E22 illustrated in FIG. 9. Initial tape number information 52 indicates the same information as the third tape number information 101. An initial list display icon 52a functions in the same manner as the third list display icon 101a. When the merge button 64 is selected on the first operation screen D1 illustrated in FIG. 11, editing for merge printing is already performed and thus the mobile terminal 1 displays the third operation screen D3 illustrated in FIG. 12 without displaying the table file selection screen not illustrated.

Figure 12:
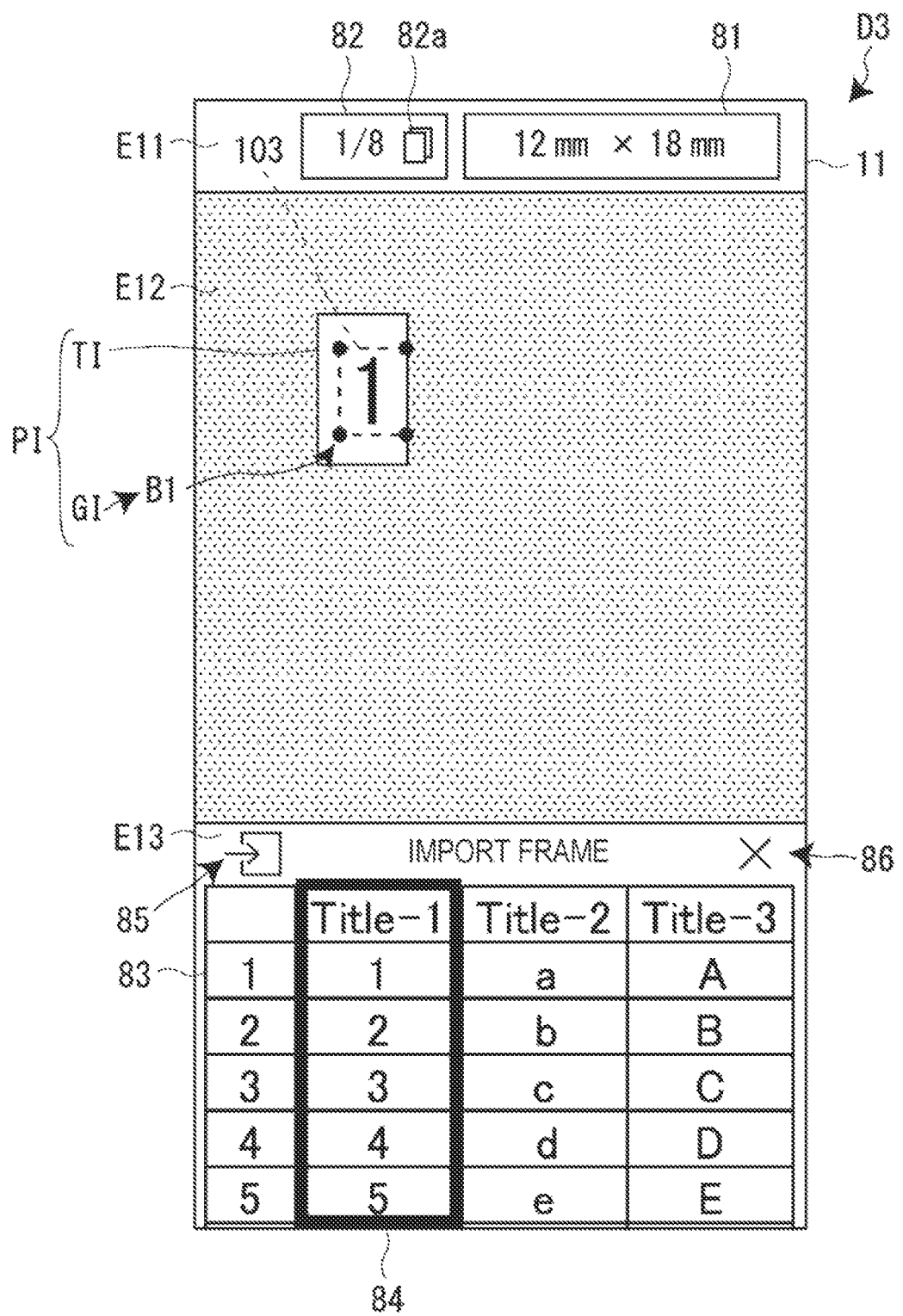
FIG. 12 is a diagram illustrating another example of the third operation screen.

The first tape information region E11 and the first region E12 that are displayed on the third operation screen D3 illustrated in FIG. 12 are the same as or similar to the third tape information region E21 and the third print image region E22 illustrated in FIG. 9, and the first table data region E13 displayed on the third operation screen D3 illustrated in FIG. 12 is the same as or similar to the first table data region E13 illustrated in FIG. 7. First tape number information 82 indicates the same information as the third tape number information 101, and a first list display icon 82a functions in the same manner as the third list display icon 101a. When the second column of determined table data 83 is selected on the third operation screen D3 illustrated in FIG. 12, and the first import button 85 is selected on the third operation screen D3 illustrated in FIG. 12 after the selection of the second column, the mobile terminal 1 displays the fourth operation screen D4 illustrated in FIG. 13.

Figure 13:
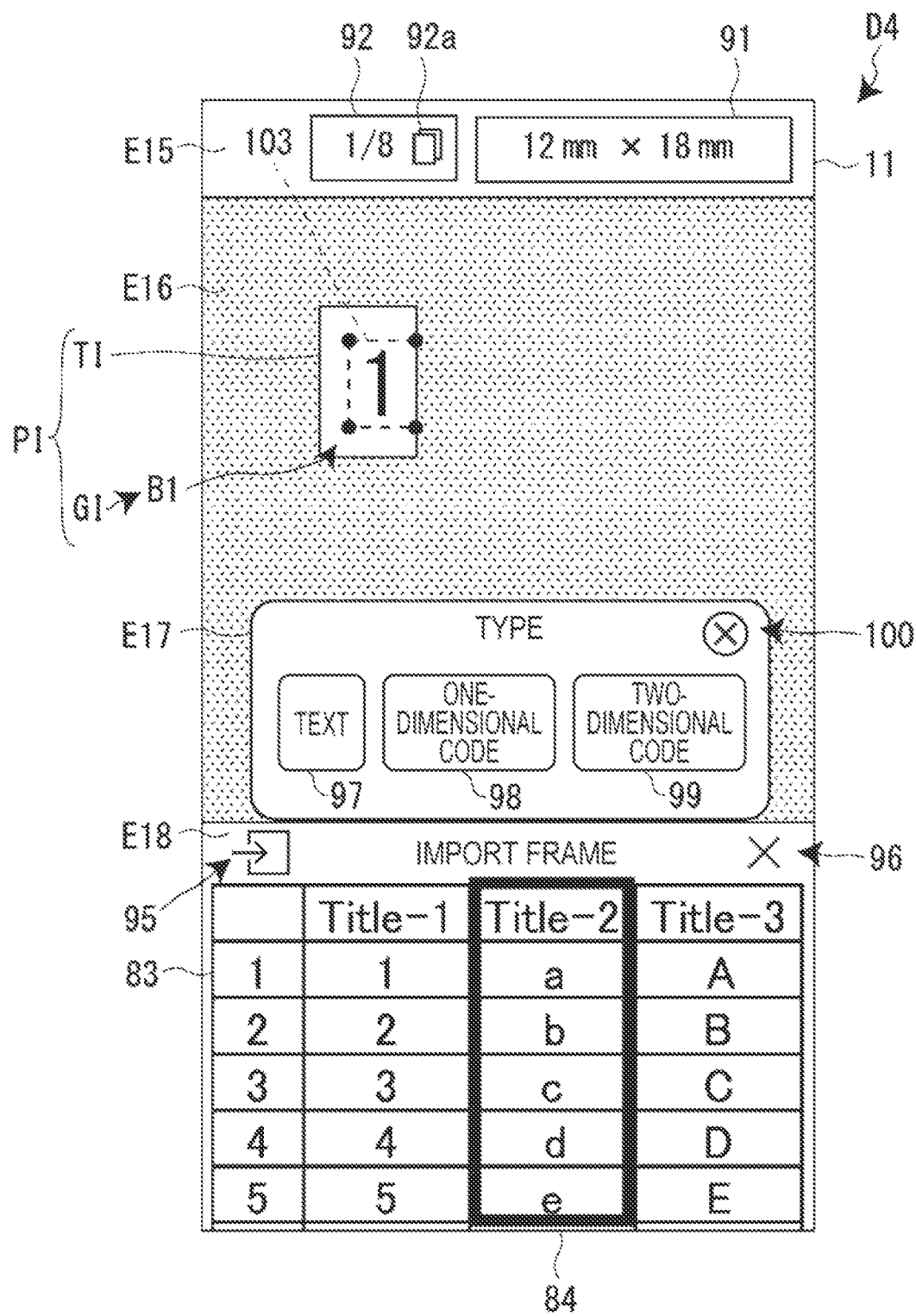
FIG. 13 is a diagram illustrating another example of the fourth operation screen.

The second tape information region E15 and the second print image region E16 that are displayed on the fourth operation screen D4 illustrated in FIG. 13 are the same as or similar to the third tape information region E21 and the third print image region E22 illustrated in FIG. 9. The second column of the determined table data 83 is selected in the second table data region E18 on the fourth operation screen D4 illustrated in FIG. 13. Second tape number information 92 indicates the same information as the third tape number information 101. A second list display icon 92a functions in the same manner as the third list display icon 101a. When the two-dimensional code option 99 is selected from the plurality of options displayed in the option region E17 on the fourth operation screen D4 illustrated in FIG. 13, the mobile terminal 1 displays the fifth operation screen D5 illustrated in FIG. 10.

The second block B2 is additionally displayed in the third print image region E22 on the fifth operation screen D5 illustrated in FIG. 10, as compared with the fifth operation screen D5 illustrated in FIG. 9. Since the example illustrated in FIG. 10 indicates a state in which the first block B1 is selected, a menu for the block type "text" is displayed in the edit menu region E23.

In the example illustrated in FIG. 10, due to the addition of the second block B2, the tape length of the tape image T1 displayed in the third print image region E22 is increased, and the tape length indicated in the third tape size information 102 displayed in the third tape information region E21 is increased, as compared with the example illustrated in FIG. 9.

Figure 14:
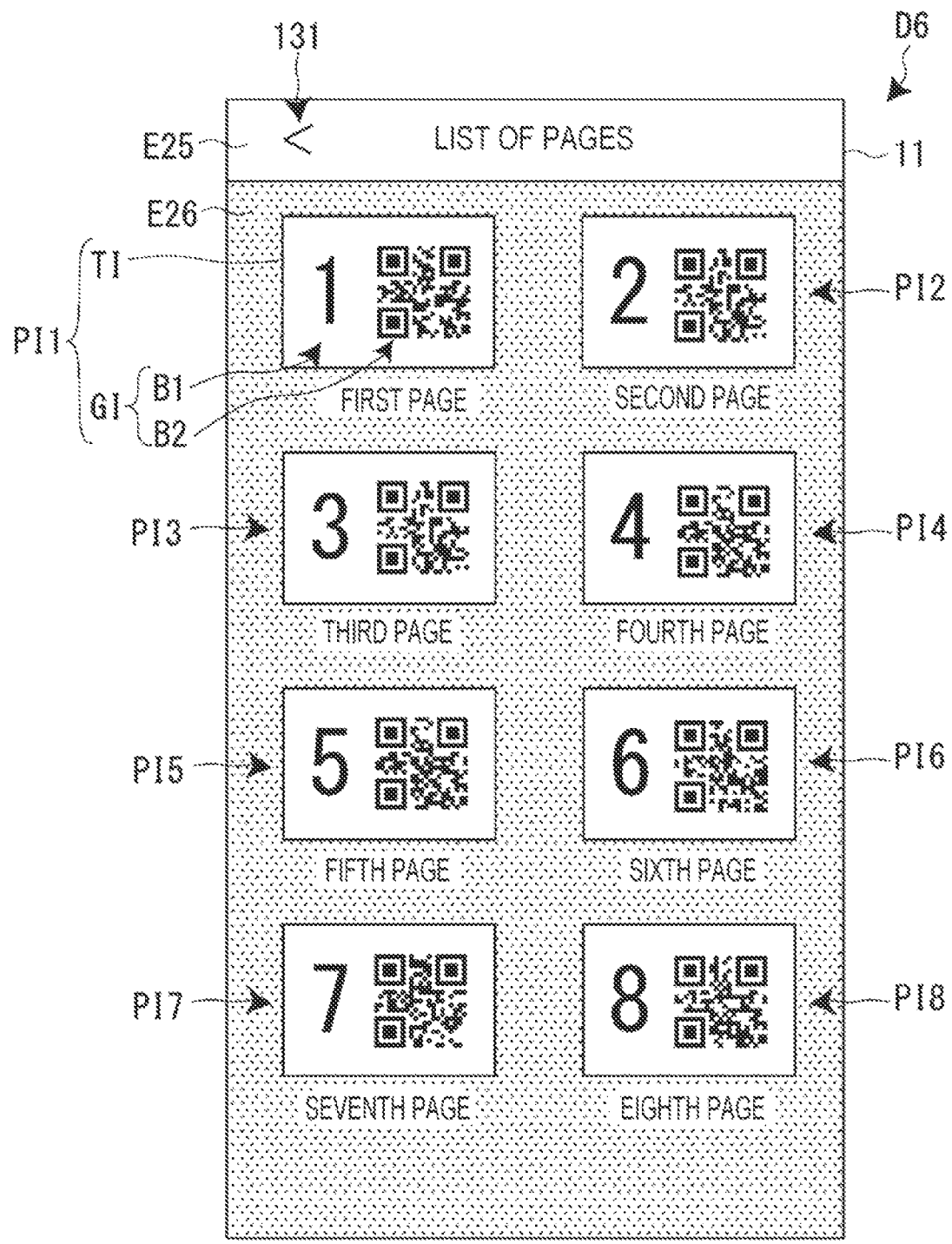
FIG. 14 is a diagram illustrating an example of a sixth operation screen.

FIG. 14 is a diagram illustrating an example of the sixth operation screen D6 displayed. When the third list display icon 101*a* is selected in the third tape information region E21 of the fifth operation screen D5, the mobile terminal 1 displays the sixth operation screen D6 on the touch panel 11.

The sixth operation screen D6 includes a return icon region E25 and a page list region E26. In the return icon region E25, a return icon 131 is displayed. When the return icon 131 is selected, the mobile terminal 1 displays, on the touch panel 11, a screen displayed before the sixth operation screen D6 is displayed. For example, when the sixth operation screen D6 is displayed by selecting the third list display icon 101*a* on the fifth operation screen D5, and the return icon 131 is selected, the mobile terminal 1 displays the fifth operation screen D5 on the touch panel 11.

In the page list region E26, a print image PI for information imported as information to be used for merge printing is displayed. For example, when the mobile terminal 1 displays the sixth operation screen D6 according to the selection of the third list display icon 101*a* on the fifth operation screen D5 illustrated in FIG. 10, the mobile terminal 1 displays print images PI for eight tapes T in the page list region E26. In the page list region E26, a first print image PI1 that is a print image PI of the first tape T is displayed as information of the first page. Similarly, in the page list region E26, an X-th print image PIX that is a print image PI of the X-th tape T is displayed as information of the X-th page.

In the example illustrated in FIG. 14, as a part of the first print image PI1, an image GI including the first block B1 and the second block B2 that are based on information of the first row of the determined table data 83 which is showed FIG. 13 and the like is displayed. The first block B1 of the first print image PI1 is a block B indicating an unconverted image based on information of the first column and the first row of the determined table data 83. The second block B2 of the first print image PI1 is a block B indicating a second code image based on the second column and the first row of the determined table data 83.

Figure 15:
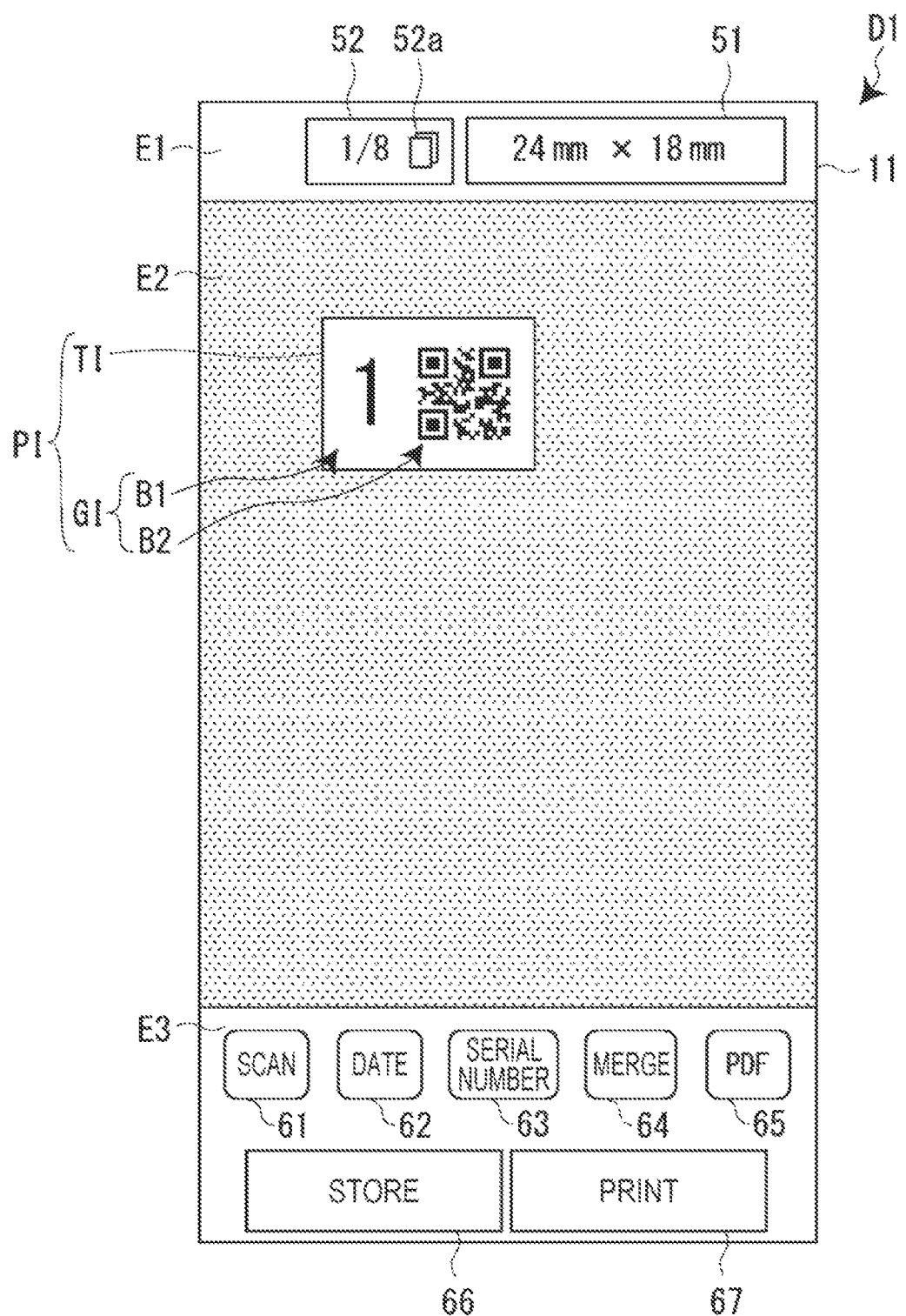
FIG. 15 is a diagram illustrating still another example of the first operation screen.

FIG. 15 is a diagram illustrating an example of the first operation screen D1 displayed when the third close button 123 is selected on the fifth operation screen D5 illustrated in FIG. 10. The initial tape information region E1 and the initial print image region E2 that are displayed on the first operation screen D1 illustrated in FIG. 15 are the same as or similar to the third tape information region E21 and the third print image region E22 illustrated in FIG. 10. When the print button 67 is selected from the operation menu region E3 of the first operation screen D1 illustrated in FIG. 15, the mobile terminal 1 generates eight print data items corresponding to the eight print images PI displayed in the page list region E26 of the sixth operation screen D6 illustrated in FIG. 14. The mobile terminal 1 transmits the generated eight print data items to the tape printing device 2.

FIG. 16 is a diagram illustrating an example of a printed tape T. The tape T illustrated in FIG. 16 is an example of the first printed tape T created when the print button 67 is selected from the operation menu region E3 of the first operation screen D1 illustrated in FIG. 15. That is, the tape T illustrated in FIG. 16 is a tape T corresponding to the first print image PI1 displayed on the sixth operation screen D6 illustrated in FIG. 14.

On the tape T illustrated in FIG. 16, a print image PG including a first partial print image PGp1 corresponding to the first block B1 of the first print image PI1 and a second partial print image PGp2 corresponding to the second block B2 of the first print image PI1 is printed. As indicated in the initial tape size information 51 on the first operation screen D1 illustrated in FIG. 15, when the print button 67 is selected from the operation menu region E3 of the first operation screen D1 illustrated in FIG. 15, a tape T with a tape length of "24 mm" and a tape width of "18 mm" is created.

As described above, the mobile terminal 1 according to the present embodiment simultaneously displays, on the fourth operation screen D4, the second table data region E18 including the determined table data 83 for performing merge printing and the option region E17 including the plurality of options for selecting how information stored in the determined table data 83 is converted and merged.

Therefore, the user can select a desired option in the option region E17 while checking the determined table data 83. In addition, the user can suppress an erroneous operation such as mistakenly selecting the one-dimensional code option 98 or the two-dimensional code option 99 from the option region E17 even though text that cannot be converted into a first code image or a second code image is stored in the determined table data 83.

When the user selects any column from the determined table data 83 displayed in the first table data region E13 of the third operation screen D3, and the first import button 85 is operated, the mobile terminal 1 displays the fourth operation screen D4 on the touch panel 11. Therefore, the user can select a desired option from the option region E17 on the fourth operation screen D4 after selecting the column from the determined table data 83 on the third operation screen D3.

The fourth operation screen D4 includes not only the option region E17 and the second table data region E18 but also the second print image region E16 in which a print image PI is displayed. Therefore, the user can simultaneously check the print image PI, the plurality of options, and the determined table data 83 on the fourth operation screen D4.

The mobile terminal 1 displays the fourth operation screen D4 on the touch panel 11 by displaying the option region E17 in a pop-up screen on the third operation screen D3. Therefore, the user can easily switch between the third operation screen D3 not including the option region E17 and the fourth operation screen D4 including the option region E17.

The mobile terminal 1 displays the third operation screen D3 such that the first print image region E12 has an area larger than the area of the first table data region E13 and that the ratio of the area of the first table data region E13 to the area of the first print image region E12 is not changed by a user operation. Therefore, the visibility of the first print image region E12 on the third operation screen D3 from the user is not reduced.

When the user selects any option from among the plurality of options displayed in the option region E17, the mobile terminal 1 displays the fifth operation screen D5 including the third print image region E22 in which the print image PI of the tape T is displayed and the edit menu region E23 in which the edit menu for print data is displayed. Therefore, since the user selects a desired option on the fourth operation screen D4, the user can cause the mobile terminal 1 to display the fifth operation screen D5 without a special user operation. In addition, the user can simultaneously check the print image PI of the tape T and the edit menu for print data on the fifth operation screen D5.

The mobile terminal 1 displays, in the third print image region E22 of the fifth operation screen D5, a block B indicating any one of an unconverted image, a first code image, and a second code image according to an option selected from among the plurality of options displayed in the option region E17. When a plurality of blocks B are displayed in the third print image region E22 of the fifth operation screen D5, the mobile terminal 1 generates a plurality of print data items so that a plurality of partial print images PGp corresponding to the plurality of blocks B are printed on the tape T. Therefore, the mobile terminal 1 can generate print data for printing the plurality of partial print images PGp on a single tape T.

The mobile terminal 1 can display, in the third print image region E22 of the fifth operation screen D5, a first block B1 and a second block B2 for which at least one of a column selected from the table data and an option selected from among the plurality of options is different from at least one of a column selected from the table data for the first block B1 and an option selected from among the plurality of options for the first block B1. In this case, the mobile terminal 1 can generate print data for printing, on a single tape T, a first partial print image PGp1 corresponding to the first block B1 and a second partial print image PGp2 corresponding to the second block B2.

The following modifications can be applied in addition to the above-described embodiment.

First Modification

Two blocks B are displayed as a part of a print image PI on the first operation screen D1 illustrated in FIG. 15. Specifically, the first block B1 generated when the first column is selected from the determined table data 83 on the first operation screen D1 and the text option 97 is selected in the option region E17, and the second block B2 generated when the second column is selected from the determined table data 83 and the two-dimensional code option 99 is selected in the option region E17 are displayed. The embodiment is not limited thereto. The display controller 130 may display, as a part of the print image PI, a plurality of blocks B for which the same column is selected from the determined table data 83 and a plurality of different options are selected in the option region E17. Alternatively, the display controller 130 may display, as a part of the print image PI, a plurality of blocks B for which different columns are selected from the determined table data 83 and the same option is selected in the option region E17, that is, the plurality of blocks of the same block type.

Second Modification

The display controller 130 may add an URL option to the plurality of options displayed in the option region E17 of the fourth operation screen D4 and display the URL option and the plurality of options in the option region E17 of the fourth operation screen D4. However, this modification is based on the premise that an URL is stored as information in a column selected from the determined table data 83 on the third operation screen D3. In this case, when the URL option is selected from among the plurality of options in the option region E17, the print data generator 120 generates print data including an image acquired by accessing the URL stored in the determined table data 83. According to this configuration, the user can select a desired option from among the plurality of options including the URL option in the option region E17.

Third Modification

The display controller 130 may display the selected table data 74 in an enlarged manner or a reduced manner on the second operation screen D2 illustrated in FIG. 6 in accordance with a user's enlargement operation or a user's reduction operation. The enlargement operation is, for example, pinch-out. The reduction operation is, for example, pinch-in. Similarly, the display controller 130 may display the selected table data 74 in an enlarged manner or a reduced manner in the first table data region E13 of the third operation screen D3 illustrated in FIG. 7 and the second table data region E18 of the fourth operation screen D4 illustrated in FIG. 8 in accordance with a user's enlargement operation or a user's reduction operation. The display controller 130 may display the print image PI in an enlarged manner or a reduced manner in the page list region E26 of the sixth operation screen D6 illustrated in FIG. 14 in accordance with a user's enlargement operation or a user's reduction operation.

Fourth Modification

In the description of the third operation screen D3 illustrated in FIG. 7, when the first column of the determined table data 83 is selected as a selected column, the mobile terminal 1 adds the selection frame 84 to the selected column and displays the selected column with the selection frame 84 added thereto, but may not display the selection frame 84. For example, instead of displaying the selection frame 84, the mobile terminal 1 may display an entire column selected by the user or a cell in a range selected by the user in a color different from unselected columns or unselected cells.

Fifth Modification

The mobile terminal 1 may be a tablet terminal or the like, instead of a smartphone. The "information processing device" may be a personal computer (PC) or the tape printing device 2, instead of the mobile terminal 1. When the "information processing device" is the tape printing device 2, the printing device side display 22 is an example of the "display unit". The "print medium" may be copy paper or the like, instead of a tape. The "information" stored in the table data may be an image such as a one-dimensional code image or a two-dimensional code image, instead of text.

Sixth Modification

The tape printing application 32 may be provided as a program to a customer. A storage medium storing the tape printing application 32 may be provided to a customer. Other modifications may be made without departing from the gist of the present disclosure.

APPENDICES

The information processing device, the method for controlling the information processing device, and the program are additionally described below.

The mobile terminal 1 includes the table data acquirer 110, the print data generator 120, and the display controller 130. The table data acquirer 110 acquires table data. The print data generator 120 generates print data including an unconverted image in which information stored in the table data is not converted into other information when a user selects the text option 97. The print data generator 120 generates the print data including a first code image obtained by converting the information stored in the table data into a one-dimensional code image of a first type when the user selects the one-dimensional code option 98. The display controller 130 displays, on the touch panel 11, the second screen including the option region E17 in which a plurality of options including the text option 97 and the one-dimensional code option 98 are displayed, and the second table data region E18 in which the table data is displayed.

The method for controlling the mobile terminal 1 includes causing the mobile terminal 1 to acquire table data, causing the mobile terminal 1 to generate print data including an unconverted image in which information stored in the table data is not converted into other information when a user selects the text option 97, and generate the print data including a first code image obtained by converting the information stored in the table data into a one-dimensional code image of a first type when the user selects the one-dimensional code option 98, and causing the mobile terminal 1 to display, on the touch panel 11, the second screen including the option region E17 in which a plurality of options including the text option 97 and the one-dimensional code option 98 are displayed, and the second table data region E18 in which the table data is displayed.

The tape printing application 32 causes the mobile terminal 1 to acquire table data, causes the mobile terminal 1 to generate print data including an unconverted image in which information stored in the table data is not converted into other information when a user selects the text option 97, and generate the print data including a first code image obtained by converting the information stored in the table data into a one-dimensional code image of a first type when the user selects the one-dimensional code option 98, and causes the mobile terminal 1 to display, on the touch panel 11, the fourth operation screen D4 including the option region E17 in which a plurality of options including the text option 97 and the one-dimensional code option 98 are displayed, and the second table data region E18 in which the table data is displayed.

According to this configuration, since the user can select an option while checking the table data, it is possible to suppress an erroneous operation such as mistakenly selecting the one-dimensional code option 98 from the option region E17 even though information that cannot be converted in a code image is stored in the table data.

In the above-described mobile terminal 1, the display controller 130 may display, on the touch panel 11, the third operation screen D3 including the first print image region E12 in which the tape image TI is displayed and the first table data region E13 in which the table data is displayed, the display controller 130 may display the fourth operation screen D4 on the touch panel 11 when the user selects any column from the table data displayed in the first table data region E13 and performs a predetermined operation, and the print data generator 120 may generate a plurality of print data items identical to the print data so that a plurality of print images PG based on a plurality of information items identical to the information and stored in the column selected by the user from the table data are printed on the tape T.

According to this configuration, the user can simultaneously check the tape image T1 and the table data on the third operation screen D3. In addition, the user can select a desired option from among the plurality of options after selecting a column from the table data.

In the above-described mobile terminal 1, the fourth operation screen D4 may include the option region E17, the second table data region E18, and the second print image region E16 in which the tape image T1 is displayed, and when the user selects any column from the table data displayed in the first table data region E13 and performs a predetermined operation, the display controller 130 may display the fourth operation screen D4 on the touch panel 11 by setting the first print image region E12 of the third operation screen D3 to the second print image region E16, setting the first table data region E13 of the third operation screen D3 to the second table data region E18, and displaying the option region E17 in a pop-up screen.

According to this configuration, the user can simultaneously check the tape image T1, the plurality of options, and the table data on the fourth operation screen D4. In addition, since the option region E17 is displayed in the pop-up screen, the user can easily switch between the third operation screen D3 not including the option region E17 and the fourth operation screen D4 including the option region E17.

In the above-described mobile terminal 1, the display controller 130 may display the third operation screen D3 on the touch panel 11 such that the first print image region E12 has an area larger than the area of the first table data region E13 and that the ratio of the area of the first table data region E13 to the area of the first print image region E12 is not changed by a user operation.

According to this configuration, on the third operation screen D3, the visibility of the first print image region E12 is not reduced and thus the user can visually recognize the print image PI of the tape T with certainty.

In the above-described mobile terminal 1, when the user selects any option from among the plurality of options displayed in the option region E17, the display controller 130 may display the fifth operation screen D5 on the touch panel 11 and the fifth operation screen D5 may include the third print image region E22 in which the print image PI of the tape T is displayed, and the edit menu region E23 in which the edit menu for the print data is displayed.

According to this configuration, the user can select a desired option from among the plurality of options displayed in the fourth operation screen D4 so as to cause the mobile terminal 1 to display the fifth operation screen D5 without performing a special operation. In addition, the user can simultaneously check the print image PI of the tape T and the edit menu for the print data on the fifth operation screen D5.

In the above-described mobile terminal 1, the plurality of options may include the two-dimensional code option 99, and when the user selects the two-dimensional code option 99, the print data generator 120 may generate the print data including a second code image obtained by converting the information stored in the table data into a code image of a second type different from the first type.

According to this configuration, the user can select a desired option from among the plurality of options including the one-dimensional code option 98, the two-dimensional code option 99, and the text option 97 on the fourth operation screen D4.

In the above-described mobile terminal 1, the display controller 130 may display a block B as a part of the print image PI of the tape T in the third print image region E22 according to an option selected by the user from among the plurality of options, and the block B indicates any one of the unconverted image in which any information included in information stored in a column selected from the table data is not converted into other information, the first code image obtained by converting any information included in the information stored in the column selected from the table data into the one-dimensional code image, and the second code image obtained by converting any information included in the information stored in the column selected from the table data into the code image of the second type, and when a first block B1 and a second block B2 for which at least one of a column selected from the table data and an option selected from among the plurality of options is different from at least one of a column selected from the table data for the first block B1 and an option selected from among the plurality of options for the first block B1 are displayed as a part of the print image PI of the tape T in the third print image region E22, the print data generator 120 may generate a plurality of print data items identical to the print data so that a first partial print image PGp1 corresponding to the first block B1 and a second partial print image PGp2 corresponding to the second block B2 are printed on the tape T.

According to this configuration, the mobile terminal 1 can generate the print data for printing the first partial print image PGp1 and the second partial print image PGp2 on a single tape T.

In the above-described mobile terminal 1, the plurality of options may include a URL option, and when an URL is stored as the information in a column selected from the table data and the URL option is selected from among the plurality of options, the print data generator 120 may generate the print data including an image acquired by accessing the URL stored in the table data.

According to this configuration, the user can select a desired option from among the plurality of options including the one-dimensional code option 98, the text option 97, and the URL option on the fourth operation screen D4.

What is claimed is:

1. An information processing device comprising:
   a table data acquirer that acquires table data;
   a print data generator that generates print data including an unconverted image in which information stored in the table data is not converted into other information when a user selects a non-conversion option and that generates the print data including a first code image obtained by converting the information stored in the table data into a code image of a first type when the user selects a first conversion option; and
   a display controller that displays, on a display unit, a second screen including an option region in which a plurality of options including the non-conversion option and the first conversion option are displayed and a second table data region in which the table data is displayed,
   the display controller displays, on the display unit, a first screen including a first print image region in which an image of a print medium is displayed and a first table data region in which the table data is displayed,
   the display controller displays the second screen on the display unit when the user selects a column from the table data displayed in the first table data region and performs a predetermined operation, and
   the print data generator generates a plurality of print data items identical to the print data so that a plurality of print images based on a plurality of information items identical to the information stored in the column selected by the user are printed on the print medium,
   wherein the second screen includes the option region, the second table data region, and a second print image region in which an image of the print medium is displayed, and
   wherein when the user selects a column from the table data displayed in the first table data region and performs a predetermined operation, the display controller displays the second screen on the display unit by setting the first print image region of the first screen to the second print image region, setting the first table data region of the first screen to the second table data region, and displaying the option region in a pop-up screen.

2. The information processing device according to claim 1, wherein
   the display controller displays the first screen on the display unit such that the first print image region has an area larger than the area of the first table data region and that the ratio of the area of the first table data region to the area of the first print image region is not changed by a user operation.

3. The information processing device according to claim 1, wherein
   the display controller displays a third screen on the display unit when the user selects an option from among the plurality of options displayed in the option region, and
   the third screen includes a third print image region in which a print image of the print medium is displayed and an edit menu region in which an edit menu for the print data is displayed.

4. The information processing device according to claim 3, wherein
   the plurality of options include a second conversion option, and
   when the user selects the second conversion option, the print data generator generates the print data including a second code image obtained by converting the information stored in the table data into a code image of a second type different from the first type.

5. The information processing device according to claim 4, wherein
   the display controller displays a block as a part of the print image of the print medium in the third print image region according to an option selected by the user from among the plurality of options, the block indicating any one of the unconverted image in which any information included in information stored in a column selected from the table data is not converted into other information, the first code image obtained by converting any information included in the information stored in the column selected from the table data is converted into the code image of the first type, and the second code image obtained by converting any information included in the information stored in the column selected from the table data into the code image of the second type, and
   when a first block and a second block for which at least one of a column selected from the table data and an option selected from among the plurality of options is different from at least one of a column selected from the table data for the first block and an option selected from among the plurality of options for the first block are displayed as a part of the print image of the print medium in the third print image region, the print data generator generates a plurality of print data items identical to the print data so that a first partial print image corresponding to the first block and a second partial print image corresponding to the second block are printed on the print medium.

6. The information processing device according to claim 1, wherein
   the plurality of options include a URL option, and
   when a URL is stored as the information in a column selected from the table data, and the URL option is selected from among the plurality of options, the print data generator generates the print data including an image acquired by accessing the URL stored in the table data.

7. A method for controlling an information processing device, the method comprising:
   causing the information processing device to acquire table data;
   causing the information processing device to generate print data including an unconverted image in which information stored in the table data is not converted into other information when a user selects a non-conversion option, and generate the print data including a first code image obtained by converting information stored in the table data into a code image of a first type when the user selects a first conversion option; and causing the information processing device to display, on a display unit, a first screen including a first print image region in which an image of a print medium is displayed and a first table data region in which the table data is displayed, causing the information processing device to display, on the display unit, a second screen including an option region in which a plurality of options including the non-conversion option and the first conversion option are displayed and a second table data region in which the table data is displayed, the second screen being displayed on the display unit in response to the user selecting a column from the table data displayed in the first table data region and performing a predetermined operation, and causing the information processing device to generate a plurality of print data items identical to the print data so that a plurality of print images based on a plurality of information items identical to the information and stored in the column selected by the user are printed on the print medium, wherein the second screen includes the option region, the second table data region, and a second print image region in which an image of the print medium is displayed, and wherein in response to the user selecting a column from the table data displayed in the first table data region and performing a predetermined operation, the display unit displays the second screen by setting the first print image region of the first screen to the second print image region, setting the first table data region of the first screen to the second table data region, and displaying the option region in a pop-up screen.

8. A non-transitory computer-readable storage medium storing a program for an information processing device, the program executing steps comprising:

causing the information processing device to acquire table data;

causing the information processing device to generate print data including an unconverted image in which information stored in the table data is not converted into other information when a user selects a non-conversion option, and generate the print data including a first code image obtained by converting information stored in the table data into a code image of a first type when the user selects a first conversion option; and causing the information processing device to display, on a display unit, a first screen including a first print image region in which an image of a print medium is displayed and a first table data region in which the table data is displayed, causing the information processing device to display, on the display unit, a second screen including an option region in which a plurality of options including the non-conversion option and the first conversion option are displayed and a second table data region in which the table data is displayed, the second screen being displayed on the display unit in response to the user selecting a column from the table data displayed in the first table data region and performing a predetermined operation, and causing the information processing device to generate a plurality of print data items identical to the print data so that a plurality of print images based on a plurality of information items identical to the information and stored in the column selected by the user are printed on the print medium, wherein the second screen includes the option region, the second table data region, and a second print image region in which an image of the print medium is displayed, and wherein in response to the user selecting a column from the table data displayed in the first table data region and performing a predetermined operation, the display unit displays the second screen by setting the first print image region of the first screen to the second print image region, setting the first table data region of the first screen to the second table data region, and displaying the option region in a pop-up screen.

* * * * *